(12) United States Patent
Tehrani et al.

(10) Patent No.: US 12,478,295 B2
(45) Date of Patent: Nov. 25, 2025

(54) WEARABLE DEVICE WITH IMPROVED MICRONEEDLE ARRAY

(71) Applicant: AQUILX INCORPORATED, Bonsall, CA (US)

(72) Inventors: Farshad Tehrani, Bonsall, CA (US); Hazhir Teymourian, San Diego, CA (US)

(73) Assignee: AQUILX INCORPORATED, Bonsall, CA (US)

( * ) Notice: Subject to any disclaimer, the term of this patent is extended or adjusted under 35 U.S.C. 154(b) by 0 days.

(21) Appl. No.: 18/513,424

(22) Filed: Nov. 17, 2023

(65) Prior Publication Data

US 2024/0172973 A1     May 30, 2024

Related U.S. Application Data

(60) Provisional application No. 63/437,447, filed on Jan. 6, 2023, provisional application No. 63/426,093, filed on Nov. 17, 2022.

(51) Int. Cl.
| | | |
|---|---|---|
| A61B 5/1473 | (2006.01) | |
| A61B 5/00 | (2006.01) | |
| A61B 5/145 | (2006.01) | |
| A61B 5/1486 | (2006.01) | |
| A61M 37/00 | (2006.01) | |

(52) U.S. Cl.
CPC .......... *A61B 5/1473* (2013.01); *A61B 5/0022* (2013.01); *A61B 5/14514* (2013.01); *A61B 5/14865* (2013.01); *A61B 5/685* (2013.01); *A61M 2037/0023* (2013.01)

(58) Field of Classification Search
CPC . A61B 5/1473; A61B 5/0022; A61B 5/14514; A61B 5/14865; A61B 5/685; A61M 2037/0023
See application file for complete search history.

(56) References Cited

U.S. PATENT DOCUMENTS

| | | | |
|---|---|---|---|
| 10,820,893 B2 * | 11/2020 | Cannon | A61B 10/0266 |
| 11,684,298 B2 * | 6/2023 | Tehrani | A61B 5/685 |
| | | | 600/345 |
| 11,877,846 B2 * | 1/2024 | Tehrani | A61B 5/14546 |
| 12,185,925 B2 * | 1/2025 | Cannon | A61B 10/0275 |
| 2008/0213461 A1 * | 9/2008 | Gill | A61K 9/0021 |
| | | | 427/2.3 |
| 2013/0197338 A1 * | 8/2013 | Yu | A61B 5/4824 |
| | | | 600/377 |
| 2014/0336487 A1 * | 11/2014 | Wang | A61B 5/6833 |
| | | | 600/352 |
| 2017/0128009 A1 * | 5/2017 | Pushpala | A61B 5/14503 |
| 2017/0164881 A1 * | 6/2017 | Fujita | A61B 5/1486 |
| 2018/0228476 A1 * | 8/2018 | Cannon | A61B 10/0275 |

(Continued)

*Primary Examiner* — Navin Natnithithadha
(74) *Attorney, Agent, or Firm* — Joseph S. Bird; C. Brandon Browning; Maynard Nexsen PC

(57) ABSTRACT

Disclosed is a wearable device with improvements to microneedles in a microneedle array including an off-center tip, a deflection guide indention, amorphous cavities which help the microneedles to bend during insertion into the skin. As the microneedles bend back after insertion, a number of sills extending from the microneedles help to hold the microneedles in place. Less damage is done to the microneedles and the surrounding tissue, thus reducing inflammation.

12 Claims, 18 Drawing Sheets

(56) References Cited

U.S. PATENT DOCUMENTS

| | | | |
|---|---|---|---|
| 2019/0001108 A1* | 1/2019 | Ono | A61M 37/0015 |
| 2020/0330014 A1* | 10/2020 | Ueda | A61B 5/150458 |
| 2021/0007723 A1* | 1/2021 | Cannon | A61B 10/04 |
| 2021/0060322 A1* | 3/2021 | Burton | A61B 5/4839 |
| 2021/0353229 A1* | 11/2021 | Pierart | A61B 5/6833 |
| 2022/0031209 A1* | 2/2022 | Windmiller | A61B 5/14514 |
| 2022/0241569 A1* | 8/2022 | Quan | A61M 37/0015 |
| 2022/0370011 A1* | 11/2022 | Windmiller | A61B 5/14532 |
| 2023/0012662 A1* | 1/2023 | Tehrani | A61B 5/0022 |
| 2023/0320636 A1* | 10/2023 | Tehrani | A61B 5/14532 600/345 |

* cited by examiner

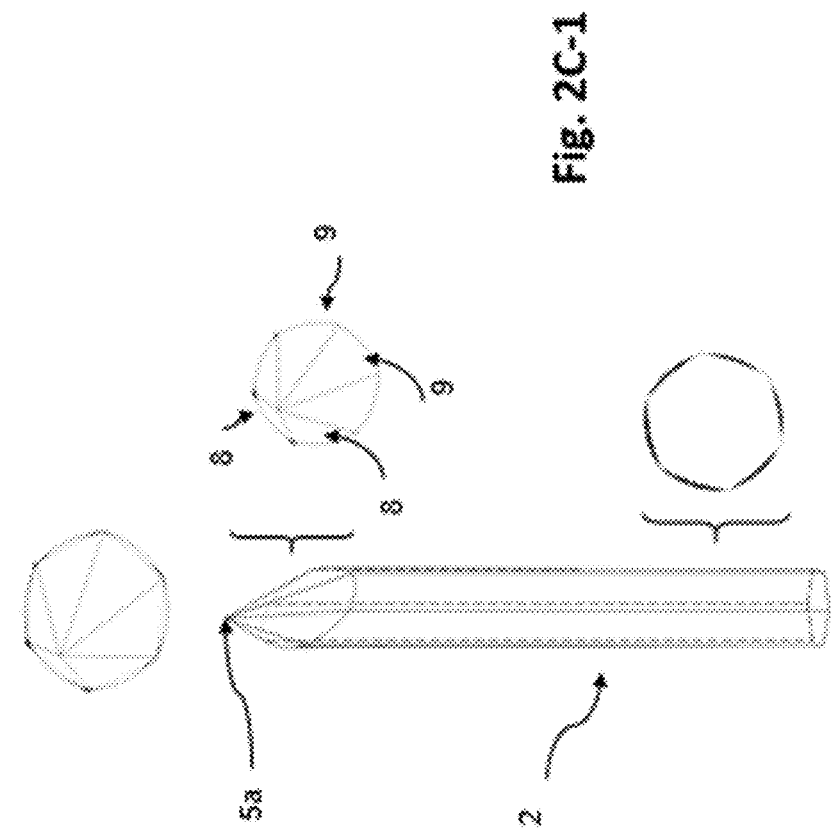

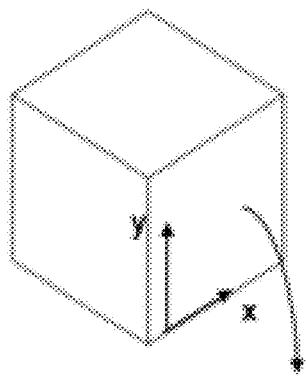
Fig. 4C1
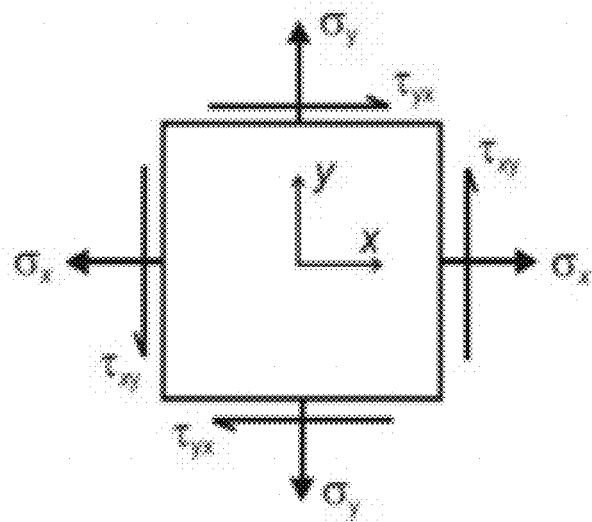
Fig. 4C2
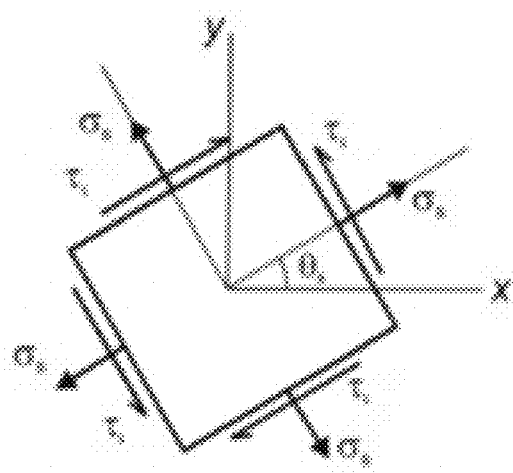
Fig. 4C3

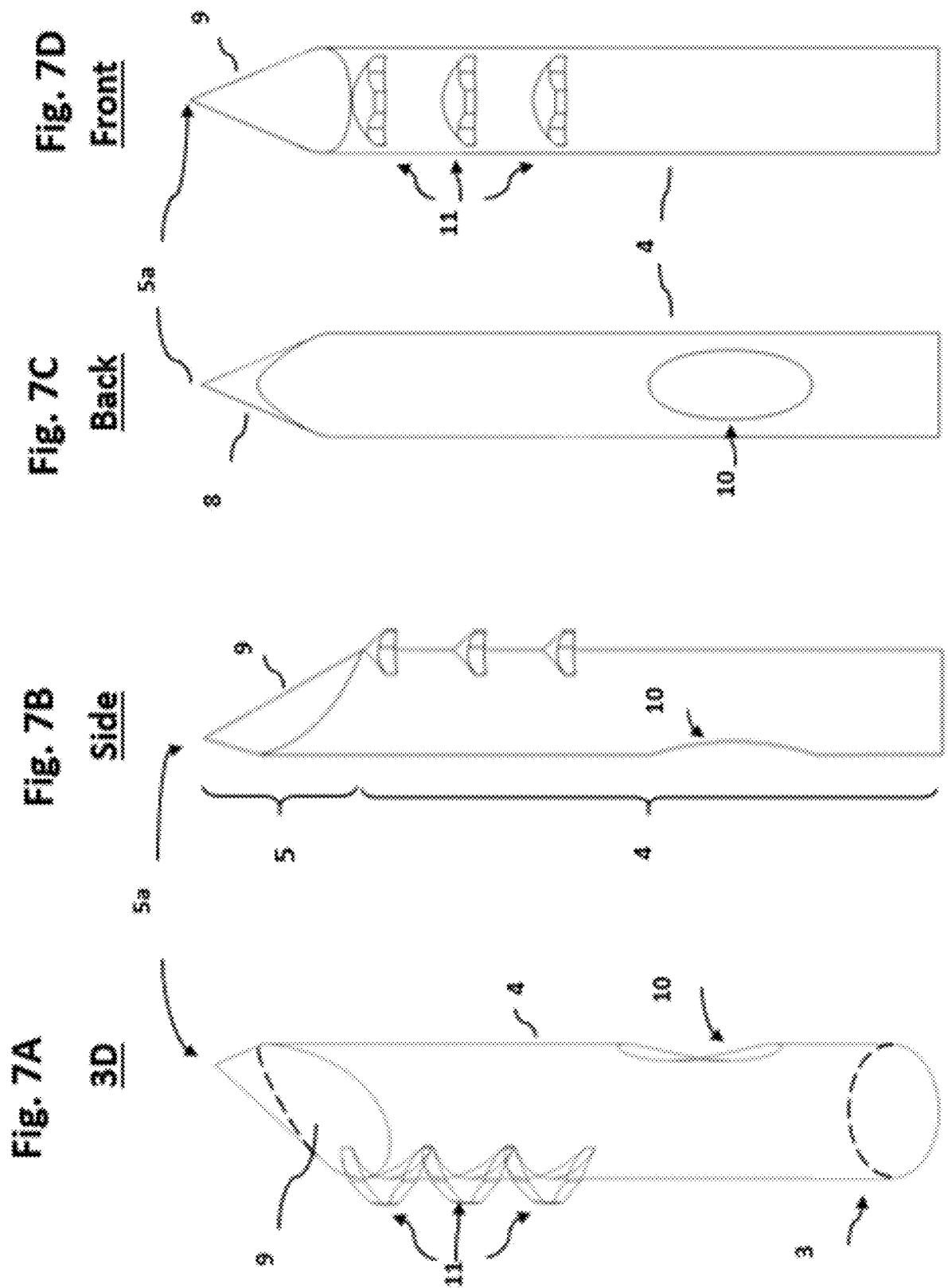

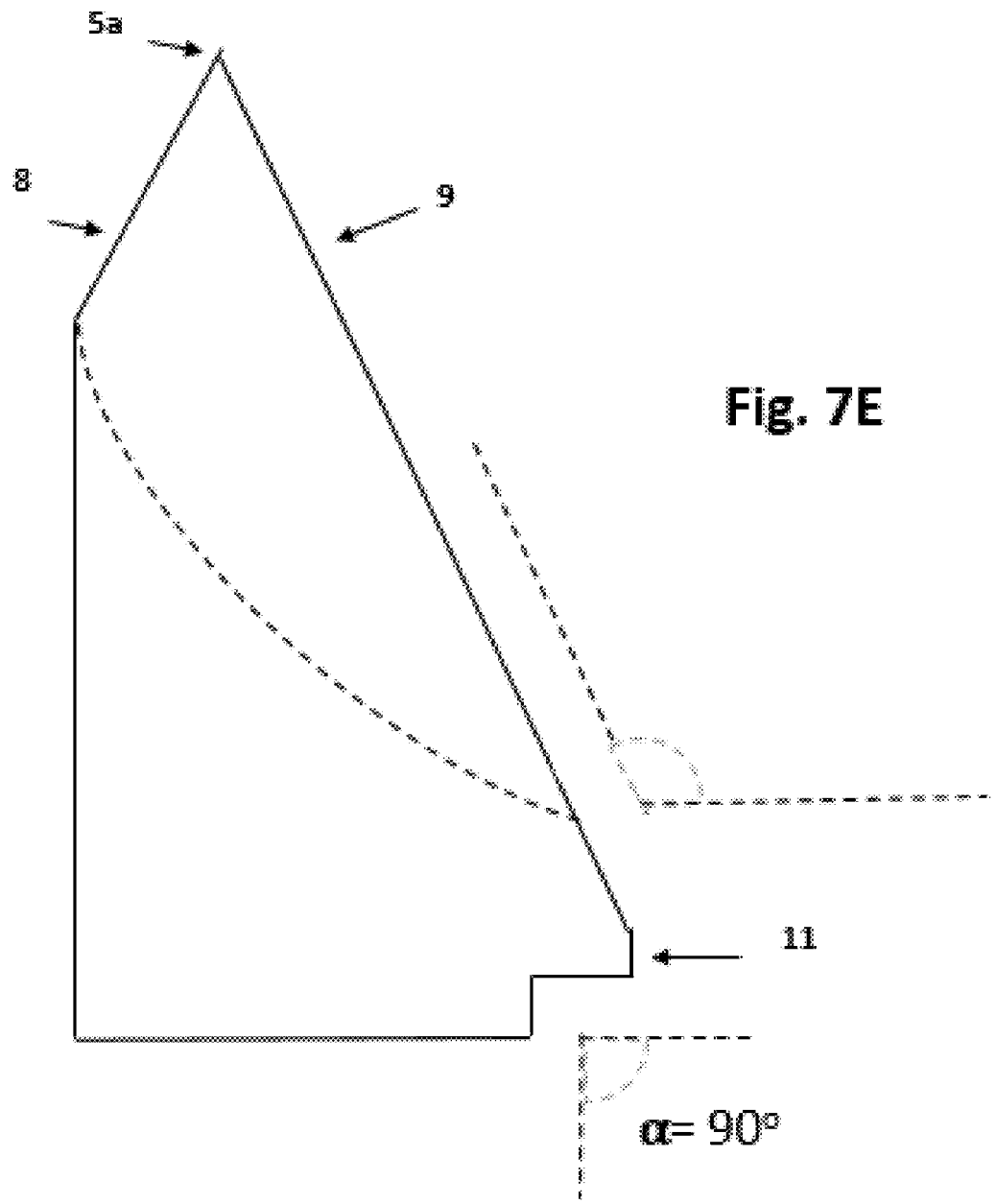

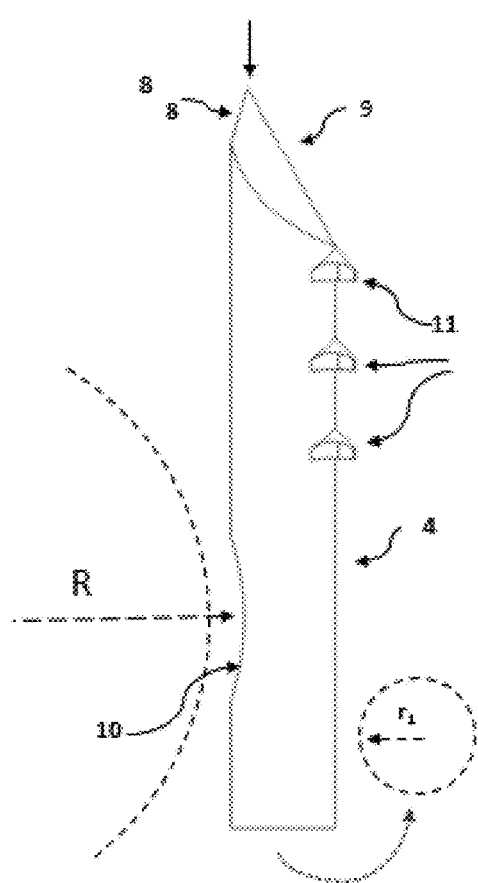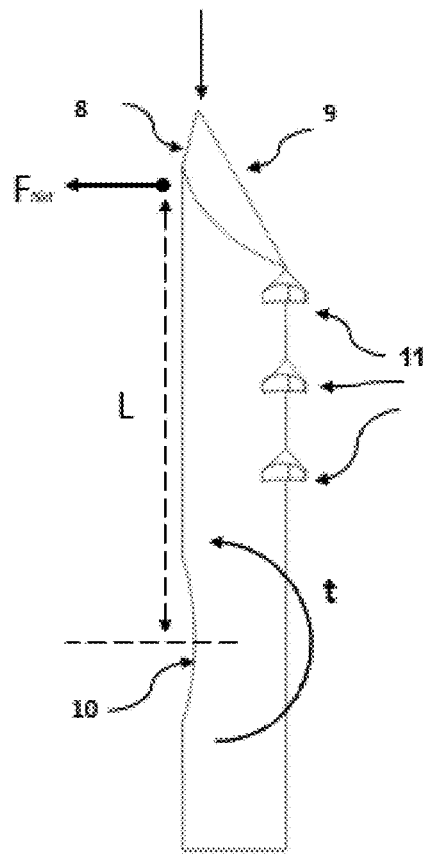

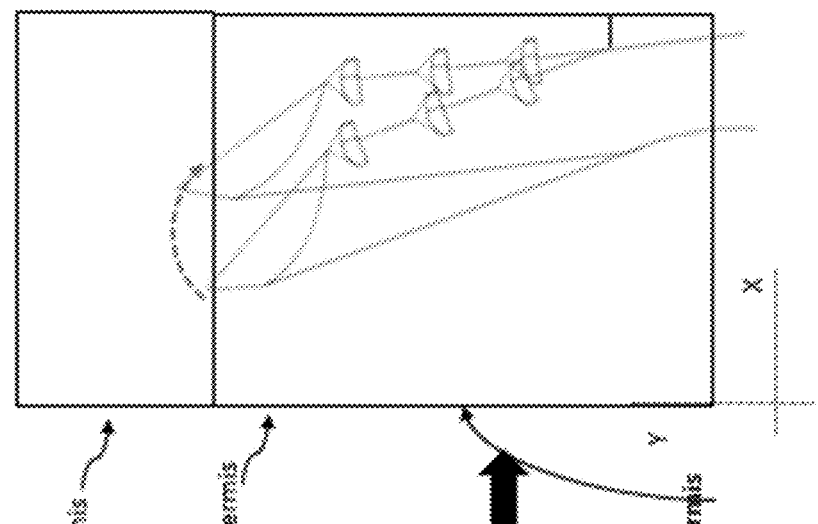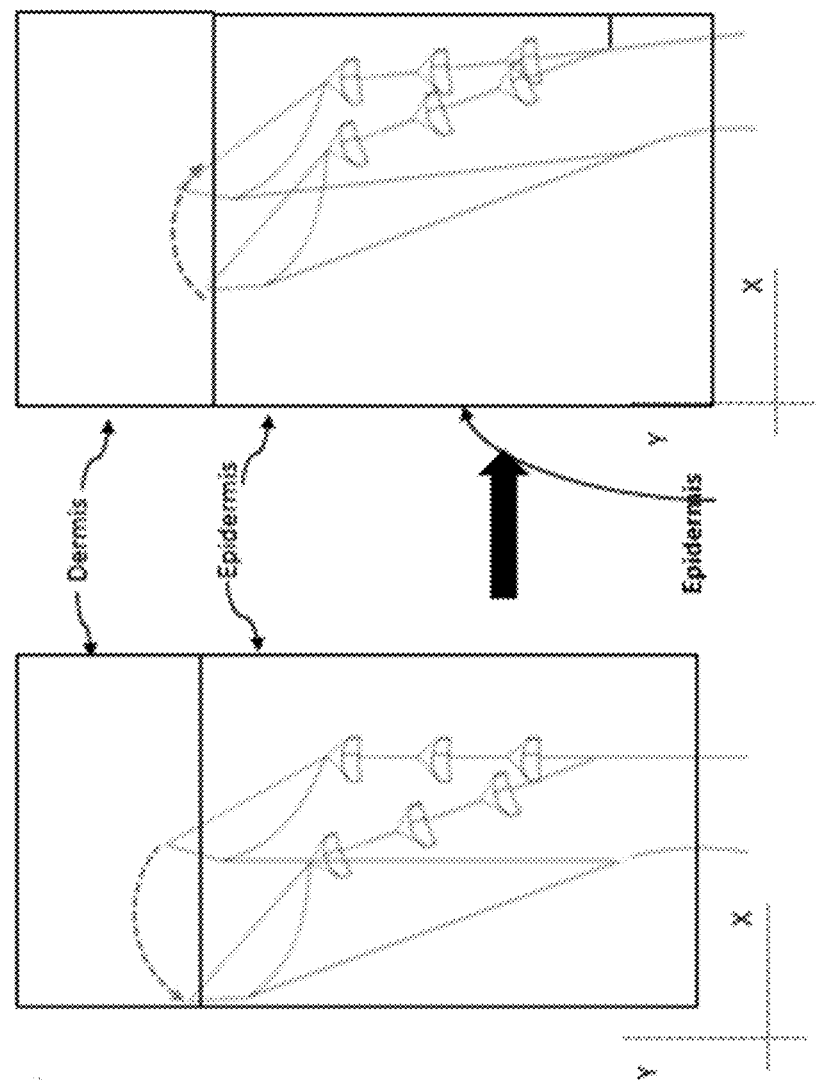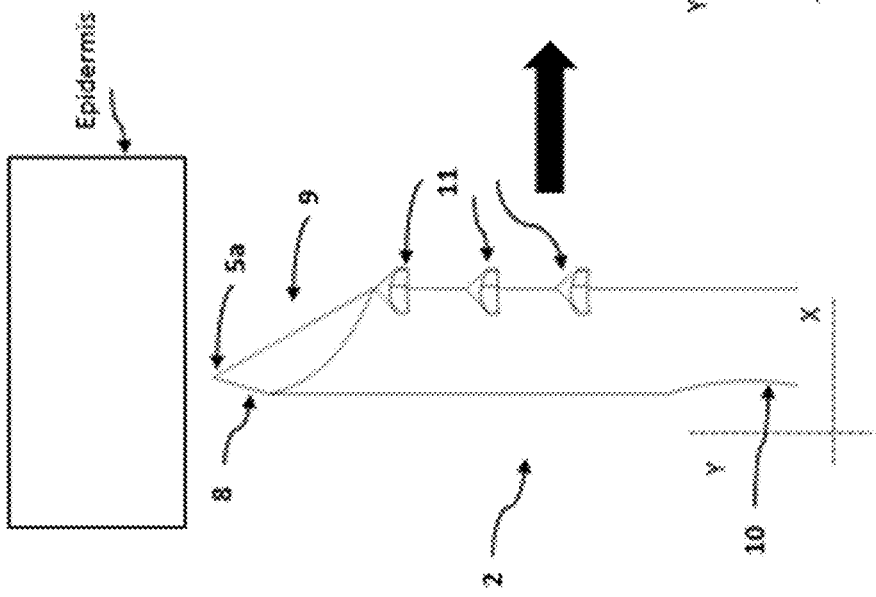

WEARABLE DEVICE WITH IMPROVED MICRONEEDLE ARRAY

PRIORITY STATEMENT & RELATION TO OTHER APPLICATIONS

This application claims priority to U.S. provisional patent application No. 63/426,093 filed Nov. 17, 2022 and U.S. provisional patent application No. 63/437,447 filed Jan. 6, 2023.

This application incorporates by reference U.S. Pat. No. 11,684,298 issued Jun. 17, 2023 ("the '298 patent"), as if set forth fully herein.

GOVERNMENT LICENSE RIGHTS

This invention was made with US government support under Grant Number: 5R44AA030231-03 awarded by the National Institute on Alcohol Abuse and Alcoholism. The US government has certain rights in the invention.

ASPECTS OF THE INVENTION

A wearable device incorporating a microneedle array, as described in the '298 patent, enables continuous monitoring of analytes in interstitial fluid (ISF) in a minimally invasive manner. One aspect of prior art microneedle arrays is that their insertion can be challenging and the difficulty of piercing the protective skin barrier can damage the microneedles and also discomfort the user. Additionally, prior art microneedles can lose the correct depth inside the body during the life of the device, typically about two weeks. The invention herein provides advances over the prior art by providing improved microneedles and related devices and methods, thus improving both insertion of the microneedles and securing them in place.

Disclosed here are devices, systems, and methods for reliable, accurate and continuous monitoring of ISF biomarkers using a wearable, non-intrusive microneedle sensor patch platform. The improvements to the microneedle array disclosed herein are also useful when the microneedle array is used in a drug delivery application.

A wearable biosensor device comprises a microneedle array comprising a substrate with microneedles disposed on the substrate, said microneedle array comprising an electrically insulative material, and at least a portion of the microneedle array being coated with an electrically conductive layer, at least some of the microneedles being configured as electrochemical sensor electrodes to detect an electrical signal from a reaction with a target analyte in a biofluid exposed to the microneedle array; and at least one of the microneedles is a working electrode functionalized with at least one chemical layer positioned on the electrically conductive layer and configured for producing an electrical signal from a reaction with a target analyte in a biofluid; the microneedles comprise a base, a body region, and a tip region comprising an off-center tip, a cover unit to couple with the substrate, the cover unit comprising a sensor-cover component formed of the electrically insulative material having an array of first openings configured to align with the array of microneedle structures on the substrate, such that the off-center tip and at least a distal portion of the body region of the microneedles pass through the array of first openings of the sensor-cover component of the cover unit; and a bottom portion of the cover unit and/or the substrate comprise microfluidic channels containing a cured custom resin extending upward to a cut-off fluidic line forming a base structure on a respective microneedle, the cured custom resin insulating and securing the cover unit to the substrate and the microneedles, and a plurality of electrical interconnections connecting the electrically conductive layer at a contact terminus in or on the substrate with an electronics unit.

The electrical interconnections comprise a contact terminus which comprises an electrically-conductive and mechanically frictionous contact pad in a hole in or on the substrate, and the frictionous contact pad is electrically connected to the electrically conductive layer, and a rigid or flexible conductive pin is connected with a friction fit at one end compressed to the frictionous contact pad and electrically connected at another end to the electronics unit. In one embodiment the electrical interconnections further comprise a bonded pin comprising two ends and being conductive and rigid or flexible, and at least one end of the bonded pin is bonded to one of the contact terminus or to the electronics unit. The electronics unit comprises a data processing unit in communication with a signal processing circuit, the data processing unit comprising a processor and a memory and configured to process the electrical signal as data representative of one or more parameters of the target analyte. The signal processing circuit is configured to process the electrical signal by one or more of amplifying the electrical signal, filtering the electrical signal, or converting the electrical signal from analog to digital, and the data processing unit is configured to process the electrical signal after processing by the signal processing circuit. The electronics unit further comprises a wireless communication unit in communication with one or both of the signal processing circuit and the data processing unit, the wireless communication unit comprising a wireless transmitter or wireless transceiver to at least transmit one or both of the electrical signal and the data to an external computing device.

The substrate and the microneedles and the cover unit are composed of a material selected from the group consisting of nonconductive polymer suitable for a mold and materials for 3D printing.

The improved microneedles comprise body region have a shape selected from the group consisting of a cylinder and a prism which is triangular, rectangular, pentagonal and hexagonal; a tip region comprising at least one major surface and at least one minor surface and the major surface and minor surface are selected from the group consisting of curved and flat; and in another embodiment comprise an indention on a side of the microneedles near the base, so that the indention is configured to guide deflection of the microneedle during insertion into a tissue; in another embodiment the body region and the tip region comprise anomalies selected from the group consisting of knobs, cavities, liquids curable into an etchable solid and solid additives; and the body region further comprises at least one sill on a side of the microneedle with the at least one major surface and opposite the indention.

The microneedles can be differentiated into at least two sensing regions so that each of the sensing regions comprises at least one of the working electrodes functionalized for a different target analyte, and each sensing region is separated electrically from all other of the sensing regions. At least one chemical layer on the sensing electrodes comprise a material selected from the group consisting of an enzyme, an ionophore, an antibody, a peptide nucleic acid (PNA), a DNA aptamer, a RNA aptamer, a molecularly imprinted polymer (MIP), and a cell.

As set forth in the '298 patent, in some aspects, a wearable, non-intrusive microneedle sensor device comprises a microneedle sensor unit coupled to an electronics unit, where the microneedle sensor unit comprises a substrate, an array of microneedles that include sensor electrodes, an array of base structures that encase a lower portion of microneedles, and electrical interconnections that electrically couple the sensor electrodes to the electronics unit for processing of detectable signals associated with one or multiple biomarkers in a biofluid. In some embodiments, for example, the microneedle sensor unit includes a substrate comprising an electrically insulative material; an array of microneedles disposed on the substrate, wherein at least some of the microneedles are configured as electrochemical sensor electrodes to detect an electrical signal from a reaction with a target analyte in a biofluid exposed to the array of microneedles, wherein at least one electrochemical sensor electrode is functionalized by a chemical layer to interact with the target analyte in the biofluid and produce the electrical signal at the at least one electrochemical sensor electrode, and wherein each microneedle of the array includes a body region and a tip region comprising an off-center tip; and an array of base structures comprising an electrical insulator material such as a custom resin which is curable, wherein each base structure encases a lower portion of the body region of a corresponding microneedle, and wherein the custom resin is flowed into microfluidic channels in the substrate or the cover unit and/or the lower portion of the body region of the microneedles; and a plurality of electrical interconnections disposed in or on the substrate, wherein each of the electrical interconnections is coupled to one or more of the microneedles configured as the electrochemical sensor electrodes and to a contact terminus in or on the substrate. In some embodiments, for example, the electronics unit is configured in electrical communication with the plurality of electrical interconnections, wherein the electronics unit includes a circuit board, a signal processing circuit configured on the circuit board, a power source in electrical communication with the signal processing circuit, and a plurality of conductive pins that electrically couple the microneedle sensor unit to the electronics unit by allowing contact between a conductive pin to the contact terminus region of a corresponding electrical interconnection. The conductive pin may be bonded to the substrate and/or to the electronics unit, or one end of the pin can make a friction fit with a hole in the substrate covered in metal deposited on the sides of the holes. In some embodiments of the microneedles, for example, the tip region of a microneedle comprises an off-center tip with a plurality of knobs, cavities and other solid additives such as spheres, sheets and fibers and also liquid additives to modify electrical and mechanical properties of the microneedles and/or substrate. In some embodiments of the microneedles, for example, the body region comprises a cylindrical or other shape of a prism (e.g., triangular, rectangular) having at least two segments, wherein a lower segment includes the lower portion of the body region that is encased by the base structure and also an indention for guiding deflection during insertion, and comprises a plurality of vertically aligned microfluidic channels, and wherein an upper segment may also include an upper portion of the body region. The body region may also comprise a plurality of knobs, cavities and other solid additives such as spheres, sheets and fibers and also liquid additives to modify electrical and mechanical properties.

The electronics unit is in electrical communication with the plurality of electrical interconnections, and the electronics unit comprises a circuit board, a signal processing circuit configured on the circuit board, a power source in electrical communication with the signal processing circuit, and a plurality of conductive pins that electrically couple the microneedle sensor unit to the electronics unit by allowing contact between an elongated region of a conductive pin to the contact terminus region of a corresponding electrical interconnection. An electrically conductive layer can be applied to the arrays described herein. A method for applying a metallic layer, for example, is selected from the group consisting of sputtering (PVD—physical vapor deposition), electroplating and electrodeposition.

The invention herein comprises an improved microneedle array which, among other things, improves skin insertion and locking into a stable position in living tissue. In one embodiment each microneedle comprises an electrically insulative material such as a nonconductive polymer configured to bend slightly during insertion as a result of novel features including an off-center tip, an indention near the base of the body of the microneedle and, in some embodiments, cavities in the microneedles. Also, in some embodiments sills extend outwardly from the body of the microneedle. As discussed in this application, the off-center tip and an indention together assist with bending upon insertion but then, after insertion, a return of the microneedle to an approximately perpendicular position relative to the substrate. The sills extending from the microneedle assist with locking the microneedle in place after insertion.

As discussed herein, the bending and locking provide many beneficial effects for performance of the microneedle over time. The benefits of the bending and locking occur in a chain: lower shear force is needed for insertion resulting in an easier cut of the skin, lower force required to rip the skin, less trauma to the skin, less bodily reaction, lower inflammatory response at the insertion area, lower biofouling at the tip, and less warm-up time resulting in longer, more stable operation of the microneedles.

In some aspects, a method for fabricating a wearable, non-intrusive microneedle sensor device includes creating or obtaining a computer-aided design of a microneedle sensor array comprising a plurality of microneedles arranged on a substrate, wherein the plurality of microneedles includes a body region, a tip region comprising an off-center tip; producing a physical rendition of the microneedle sensor array, wherein at least some of the plurality of microneedles of the produced physical rendition of the microneedle sensor array include an electrically-conductive region to form microelectrodes of the at least some of the plurality of microneedles; and attaching a cover unit to the physical rendition of the microneedle sensor array, the cover comprising an electrically insulative material having a plurality of openings configured to align with the plurality of microneedles on the substrate, such that the tip region and at least a distal portion of the body region of the microneedles configured to pass through the openings of the cover unit.

Drawing lithography is another fabrication method for the microneedle array in which a melted material selected from the group consisting of polymer, composite, ceramic and metal is drawn from a planar substrate directly to a 3D microneedle structure without the need for a mask and light irradiation. This will also include new classes of meltable material, some to be developed in the future, which can solidified in a new shape. Also suitable is magnetorheological drawing lithography (MRDL), a modified form of drawing lithography, in which an external magnetic field is used to draw a droplet of a curable magnetorheological fluid to form 3D microneedles with improved sharpness and length of the resulted microneedles.

Another fabrication method for the microneedle array is micromachining with the final structure produced by removal of a stock material to the desired geometry. The desired geometry is first virtually created in a 3D modeling software, and then transferred to a micro-computer numerical control (CNC) machine that runs in at least two axes (i.e., XY) while chipping off the materials from the stock material by the CNC bits installed on the tip of the moving CNC head. The materials for micromachining are selected from the group consisting of the machinable polymeric materials such as PMMA, Acrylic, Polycarbonate, PEEK etc., some metals including aluminums and steels and softer ceramic materials. Conductive materials such as the metals in the group are passivated electrically with a nonconductive coating before a microarray with them is used in the wearable device.

3D printing, or additive manufacturing, is a method for fabrication of microneedle arrays. 3D printing is used here as a broad term for stereolithography, fused filament fabrication, digital light processing, and scan, spin, & selectively photocuring (3SP) methods. The materials for 3D printing are selected from the group consisting polymers such as (PLA (polylactic acid)), ABS (acrylonitrile butadiene styrene) and TPU (thermoplastic polyurethane); metals such as titanium, stainless steel and aluminum; ceramics such as zirconia and alumina; composites such as carbon fiber reinforced plastics and glass-fiber reinforced plastics; resins such as photopolymers for SLA (stereolithography) and DLP (digital light processing) and are cured by UV light and epoxy resins; powders such as nylon powder used in SLS (selective laser sintering) and metal powders such as titanium, stainless steel, and aluminum, used in metal 3D printing processes like DMLS (direct metal laser sintering); hybrids such as polymer-metal hybrids and ceramic-polymer hybrids; other specialty materials such as conductive filaments, high-temperature resistant filaments such as PEEK, and biocompatible materials: for medical implants and prosthetics; and new materials and combinations of the above. 3D printing techniques are versatile fabrication methods in terms of microneedle geometry, spacing, height, numbers, and two-photon polymerization (TPP) SLA allows the fabrication of higher resolution. Conductive materials such as the metals in the group are passivated electrically with a nonconductive coating before a microarray with them are used.

Other methods of fabricating microneedle arrays are also within the scope of this application including, without limitation, making a master, e.g. a metal master, (e.g. of aluminum), making a mold, for example a PDMS mold from the master, and then forming a sensor array, for example from epoxy, in the mold. The electrodes are then formed on the sensors by forming a mask on the sensor body defining a number of openings corresponding to the areas to be covered by the electrodes, and then applying the conductive coating to the areas exposed by the mask to form the electrodes.

The invention herein does not include a device comprising a silicon or a micro electronic mechanical system (MEMS) microneedle array, or other variants made by associated techniques.

In addition to the electrical interconnections described herein, the microneedle array, formed as described herein, may also be connected using prior art techniques to the electronics unit of the device for signal processing.

Insertion of the improved microneedles herein just below the dermis layer of the skin is the first step for using a device with a microneedle array, and the performance and life of the microneedle array can be affected by the insertion itself. Insertion subjects the microneedles to stresses which can damage them and the tissue region at the insertion site. To produce a better outcome, the present system comprises novel microneedle features not seen in the prior art.

The improved microneedles herein also comprise microanomalies such as knobs, cavities and other additives which have many mechanical and electrical benefits, as discussed herein.

BRIEF DESCRIPTION OF THE FIGURES

FIGS. 2A-2C depict microneedles of different shapes with off-center tips. FIG. 2C-1 depicts two cross-sections of a hexagonal bottom, and a circle top cross-section.

FIGS. 4C1-4C3 depict microneedle tips schematically from the side during insertion.

FIGS. 7A-7D are 3D and side, back and front drawings of the microneedle comprising the off-center tip, the indention and the sills. FIG. 7E is a section view of the tip region showing angles.

FIGS. 8A-8D illustrate the ratio of indention radius (R) to the radius of the microneedle bodily cross section (r1) having a direct relation with the dl of the tip (deflection magnitude).

FIGS. 9A-9C depict deflection and needle locking.

EXAMPLE EMBODIMENTS

Figures 1A, 1B:
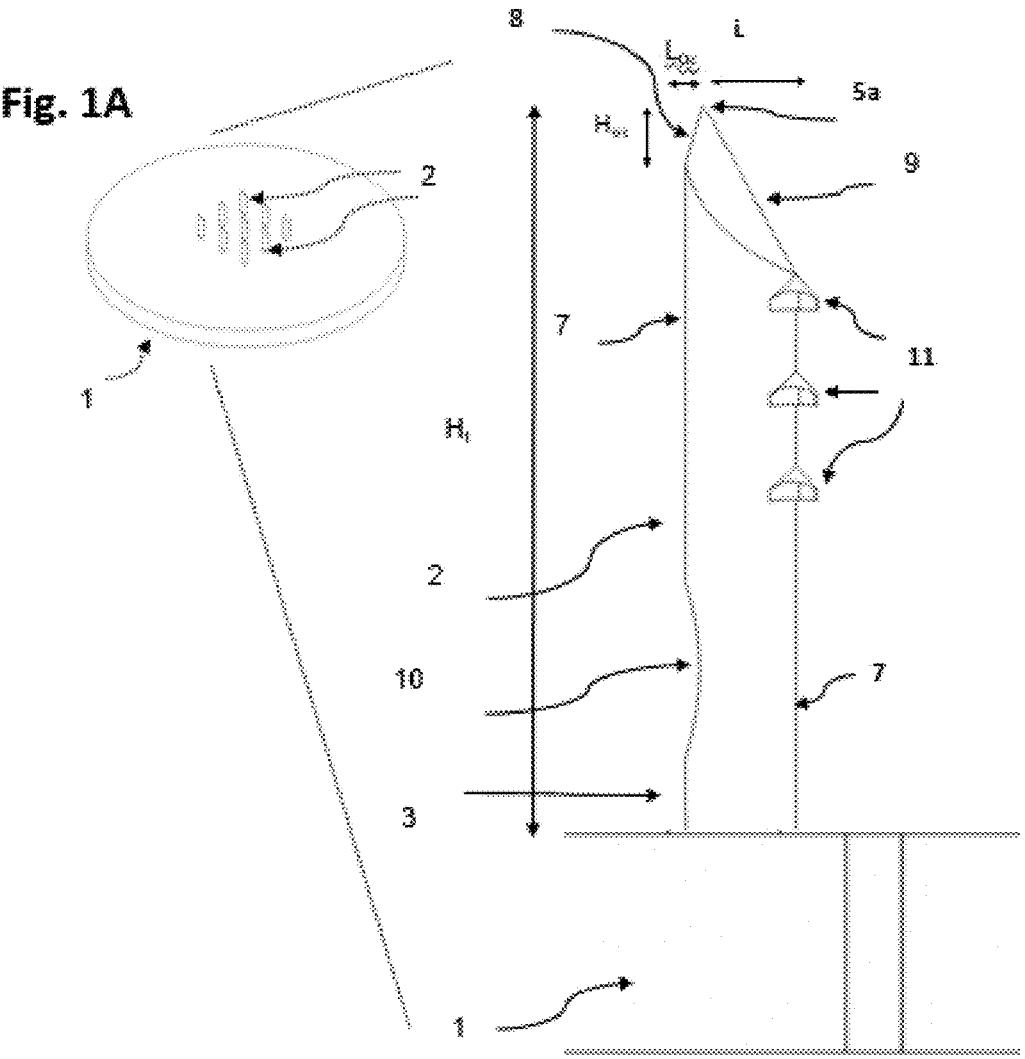
FIGS. 1A and 1B depict an improved microneedle array and an enlargement of one microneedle with an off-center tip, an indention and sills.

FIGS. 1A-1B depicts one embodiment of properties and aspects of a cylindrical microneedle design including structural features for skin insertion and for interlocking. FIG. 1A is a perspective view of the substrate 1 and the microneedles 2 integral with the substrate comprising an electrically nonconductive material selected from the group consisting of nonconductive polymer, composite, ceramic and the like. In one embodiment, the substrate and microneedles are integral to one another and comprise a nonconductive polymer cured by UV light in a mold. Some features of the substrate are omitted in this view, such as the channels which separate the microneedle regions and the microfluidic channels containing a custom resign which has been flowed and cured. FIG. 1B is an enlarged side view of one of the improved microneedles 2 from a base region 3, through a body region 4 and to a tip region 5 comprising an off-center tip 5a and a section view of the substrate 1. The off-center tip can be positioned anywhere between the outer edge 7 of the microneedle and the center C (or c), shown in dotted line in FIG. 3C, and the off-center tip is accompanied by a major surface 9 and a minor surface 8. The off-center tip 5a improves skin insertion by reducing the amount of force needed and by minimizing tissue damage and an immune response at the insertion site. Here, $H_t$ is total height of the microneedle tip above the upper surface of the substrate, and $H_{oc}$ is the height of the tip to the lowest point of a minor surface 8 of the tip region. L is the width of the off-center tip to the edge on the side of the major surface, and $L_{oc}$ is the distance from the off center tip to the edge 7 joining the minor surface. Embodiments of the microneedle which are cylindrical comprise a single major surface and a single minor surface, while multiple major and minor surfaces are added in additional embodiments, especially where the body region is not cylindrical, as in FIG. 2C.

An indention 10 near the base 3 weakens one side of the microneedle on the side with the off-center tip to allow the microneedle to guide deflection of the microneedle to the side of the indention during skin insertion. In the embodiment of FIG. 1B three sills 11 are depicted starting just below where the major slope of the off-center tip intersects with the microneedle body, but any number of sills can be used. In the embodiment of FIG. 1B, the sills are on the edge 7 of the microneedle opposite the off-center tip and the indention. These sills extend outward from the body of the microneedle with a downward slope to complement the slope of the off-center tip. The slope of the sills, in various embodiments, are on the upper portion of the sills nearest the tip but not on the lower portion nearest the base. Thus, the sills are relatively more easy to insert than to remove and in this way, the sills help to lock the microneedles into place after insertion. It should also be noted that, after the flexing during insertion as shown in FIGS. 9B and 9C, the microneedle will return to an approximately perpendicular position as in FIG. 9C (before insertion) and, as the sills move, they will position the microneedles more firmly into the tissue.

There are a number of different embodiments in addition to the cylindrical microneedle depicted in FIG. 1B, such as a prism with variable numbers of sides or an oval or squoval. Several embodiments of the off-center tip in which the needles are non-cylindrical are shown in FIGS. 2A-2C, respectively triangular, pentagonal and hexagonal. FIG. 2C-1 exemplifies two cross-sections of a hexagonal bottom, and a circle top cross-section. The major and minor surfaces of the off-center tip may exist in a number of embodiments selected from the group consisting of curved, flat and/or textured surfaces. In some embodiments, the off-center tip comprises curves on the major and minor surfaces and in other embodiments the major and minor surfaces are flat or textured, as for example in FIG. 2C. In other embodiments the major and minor surfaces comprise a combination of curved, flat and/or textured surfaces. The shape of the curves can vary greatly. The textured surfaces are described elsewhere herein.

Figure 3B:
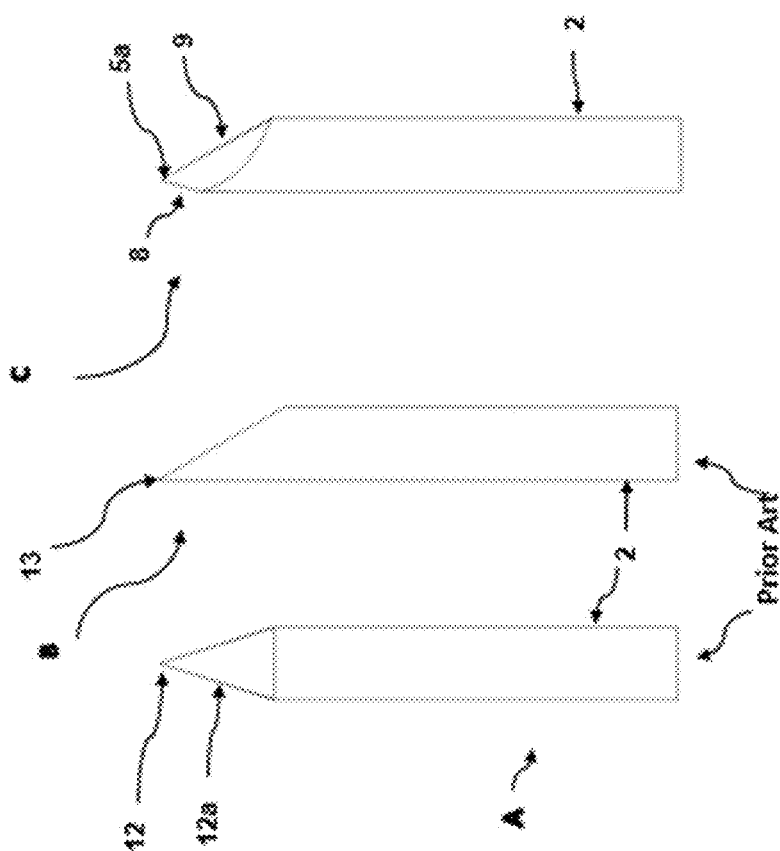
FIGS. 3A and 3B are perspective and side views of microneedles, respectively, which contrast prior art microneedles with improved off-center tips.
Figure 3A:
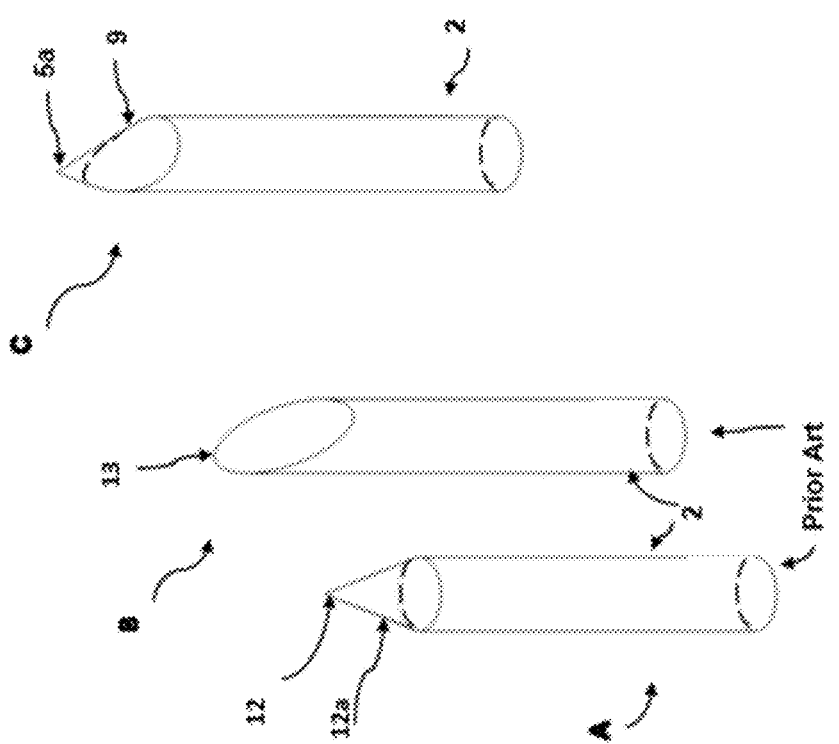
Figure 3C:
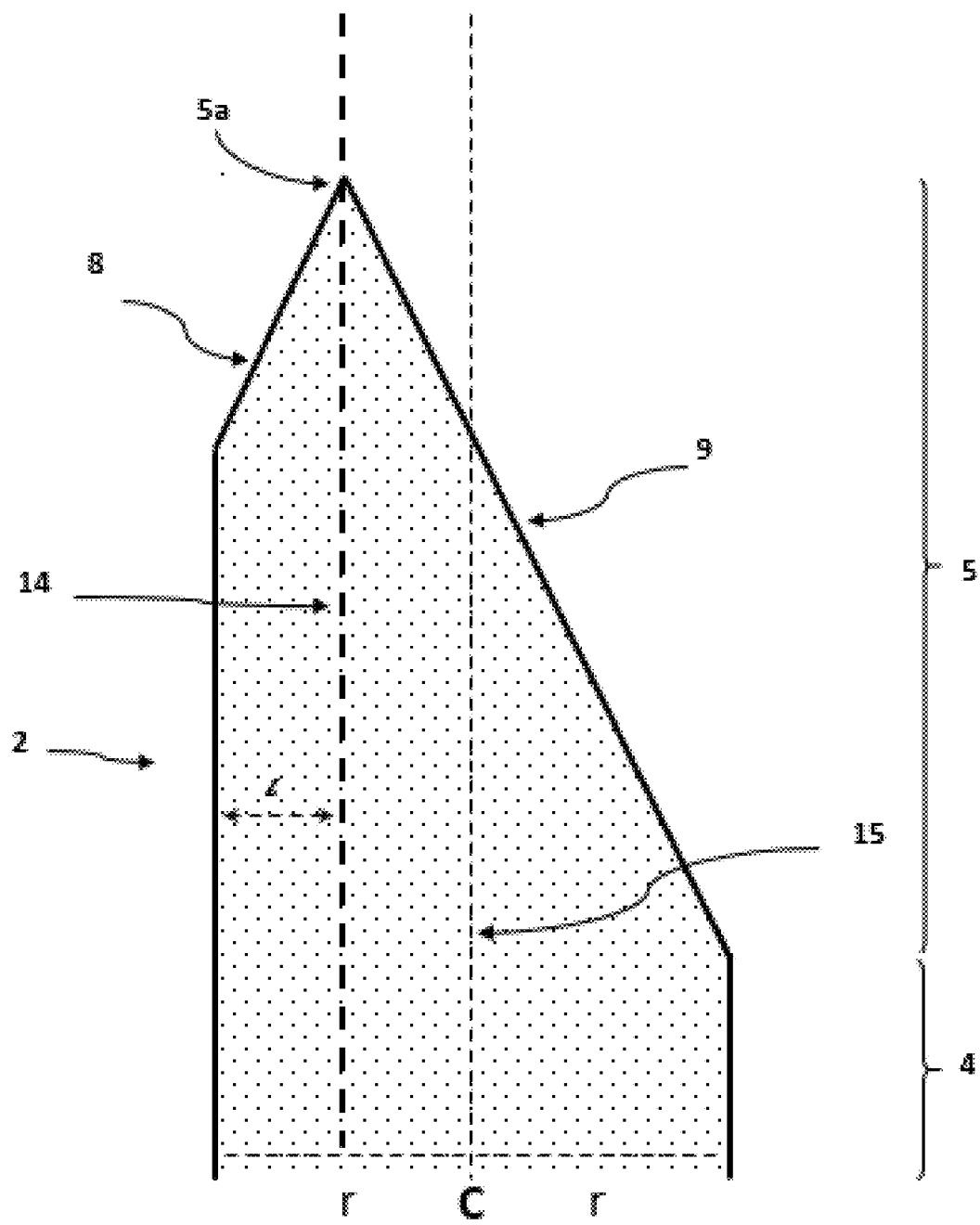
FIG. 3C is a section view of the off-center tip in the tip region.

As also shown in FIGS. 3A-3B, the off-center tip is a significant improvement respectively over both a prior art conical tip 12 (items A and B in a perspective view in FIG. 3A) having a conical slope 12a and a prior art single-bevel, non-conical tip 13 (items A and B in a side view in FIG. 3B) (i.e., where 0≤loc<c and loc is the normal distance from the outer edge 7 to the axis crossing the off-center tip and C is the center of the microneedle). As shown, the off-center tip provides an intrinsic deflection-ability to the microneedle body during the insertion and further reducing insertion forces as discussed herein. The indention 10 is not shown here. In FIG. 3C a cross-section of microneedle labeled C in FIGS. 3A-3B, the dotted line 14 is the vertical axis passing through the off-center tip, and the dotted line 15 originating from C is the vertical axis of the center of the microneedle and r is the radius of the body region of the microneedle.

Figures 4A, 4B:
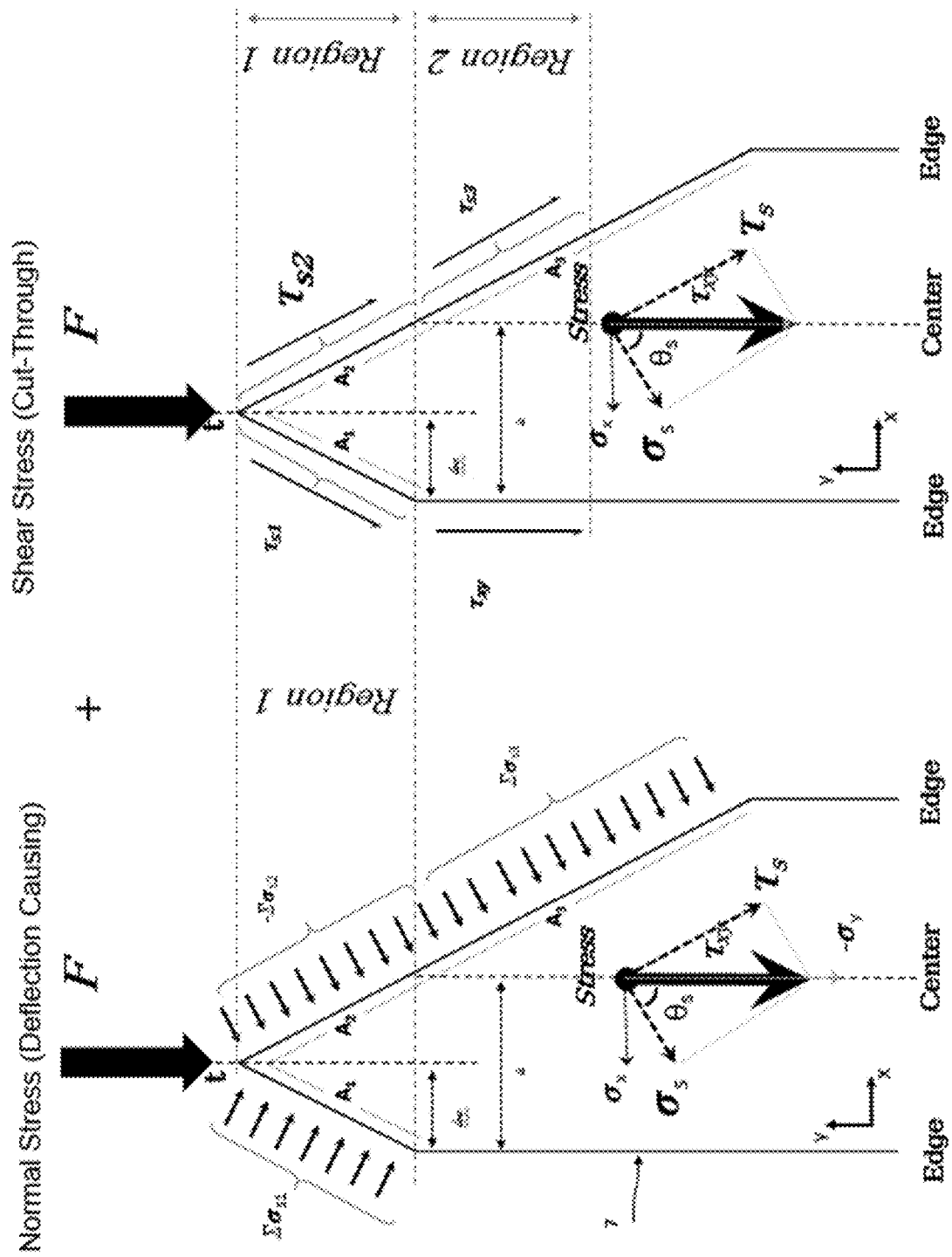
FIGS. 4A and 4B depict normal stress and shear stress during insertion.

The movements enabling the off-center tip to reduce insertion force as well as the deflection mechanism is explained further in FIGS. 4A-C. During the insertion of the off-center tip, a skin-insertion applied force of 'F' converts into two primary stresses of shear stress (τ) which is responsible for the microneedle cutting through the skin, and normal stress (σ) which is responsible for both the deflection of the microneedle body, and the penetration of the microneedles into the skin. With an off-center tip, there is a region one in which the major and minor surfaces pierce the skin in an approximately symmetrical fashion and, after the tip has pierced region one, region two with the longer surface, (i.e., the major surface) is now passing into the skin causing greater shear stress.

In FIGS. 4A-C, and elsewhere herein, the following terms apply:

F/A=Stress
σ=Normal Stress=±$F_n$/A
τ=Shear Stress=±$F_p$/A
$dl_t$=displacement of the tip
F=Force applied
A=Surface area
$F_p$=Force parallel to A
$F_n$=Force normal to A
$L_{oc}$=normal distance from edge plane to axis crossing tip of microneedle
$L_c$=normal distance from edge plane to axis crossing center of microneedle cross section
$σ_s$=Normal to plane stress=F·cos($θ_s$)/A
$σ_x$=Deflection causing stress=$F_{torch}$/(A·Sin ($θ_s$))
$τ_s$=F·sin ($θ_s$)/A
$τ_{xy}$=cutting-through stress
cos(90°−$θ_s$)=$τ_s$/$τ_{xy}$
$τ_{xy}$=$τ_s$/sin/($θ_s$)
cos $θ_s$=sin(90−$θ_s$)

FIG. 4A is an enlargement of the tip region comprising an off-center tip and upper body of the microneedle in 4A showing normal stress/deflection causing forces in regions one and two of insertion. FIG. 4B is an enlargement of the tip region and the off-center tip and upper body of the microneedle in 4A showing shear stress/cut through forces in regions one and two. FIGS. 4C1-4C3 contains three diagrams showing the above movements in X and Y axes showing microneedle tips schematically from the side. The bottom rectangle in FIG. 4C3 represents the force from normal stress on region one. The top rectangle in FIG. 4C2 represents the direction of shear stress from region two's entry into the skin.

Normal Stress (σ) or Deflection-Causing/Penetration Stress: The applied insertion force of F at region one, as seen in FIGS. 4A and 4B, converts into equally opposing normal stresses ($Σσ_{sx}$) at the X axis and dual positive normal stresses on the Y axis ($Σσ_{sy}$). The equally opposing normal stresses, neutralize each other (i.e., |$Σσ_s$|=|$Σσ_{x1}$|−|$Σσ_{x2}$|=0) resulting in a net deflection stress at the X axis equal to zero ($\sigma_{xNET}$=0). Dual positive stresses result into a net penetration stress at the Y axis larger than zero (i.e., $|\Sigma\sigma_s|=|\Sigma\sigma_{y1}|-|\Sigma\sigma_{y2}|>0$) which, causes the penetration of the microneedle into the skin. This means that at the first moments of microneedle insertion, with respect to the normal stress effect on the off-center tip 5a, there is no deflection to the body of the microneedle and insertion takes place parallel to the Y (vertical) axis because the normal stress on areas $A_1$ and $A_2$ are equal and in opposite direction on the X axis. At region two, however, as a result of the geometry-based removal of normal stress on the left edge of the microneedle, there is zero opposing deflection force to neutralize deflection forces on area $A_3$. Thus, a net deflection force of $\theta_{xNET}=-\Sigma(\theta_{s3})\cdot\sin\theta_s$ from the major surface will cause displacement of the microneedle tip/body in the x axis and in a negative direction ($(|dl_x|>0)$ to the left as shown, for example in FIG. 9B. Therefore, the off-center tip causes a dynamic deflection in region one of insertion versus region two. The magnitude of the deflection during the insertion stage is dependent upon the $l_{oe}$ which ranges from $0 \leq l_{oc} < c$, (i.e., $dl_x \propto \sigma_{xNET} \propto (l_c/l_{oc})$, $0 < (l_c/l_{oc}) < 1$), i.e., anywhere between the edge plane and the center of the microneedle.

Shear Stress (t) or Cut-through-stress: In FIG. 4B the applied insertion force of F at region one also translates into equal shear stresses (i.e., $\tau_{s1}$ and $\tau_{s2}$) acting on the same −y axis direction, causing a positive stress that is responsible for cutting through the outermost layer of the epidermis ($|\Sigma\tau_{xy}|=|\tau_{s1}+\tau_{s2}|/|\sin\theta_s|, >0$). At region one, the magnitude of the shear stress is moderate and significantly increases throughout region two as, again, the off-center tip 5a is moved to the left as shown in FIG. 9B. During microneedle insertion, when the off-center tip 5a of the tip region 5 reaches region two, there is a pure shear force from the left, non-angled side of the microneedle ($\tau_{xy}$) that adds to the shear force applied to the $A_3$ ($\tau_{s3}/|\sin\theta s|$) which are responsible for the significant increase of the shear stress at region two (i.e., $\Sigma\tau_{xy}|=|\tau_{xy}+(\tau_{s3}/|\sin\theta_s|$, therefore $|\tau_{xyNET}|>>0$, therefore: $|\tau_{xynet\ of\ Region\ 2}|>>\tau_{ynet\ of\ Region\ 1}|$ This means that region two total shear stress is greater than for region one. The relationship between $l_{oc}$ and the cut-through stress, as well as the $l_{oc}$ to the applied force required is established to be $\tau_{xyNET}\propto(lc/l_{oc})$, and $F_{ins-required}\propto(l_c/l_{oc})$, respectively. This means that manipulation of the $l_{oc}$, within the boundary conditions of $0 \leq l_{oc} < c$, allows optimizing of the practical requirements such as microneedle array insertion force and materials properties capable of producing a large enough safety factor.

Shear Stress (τ)/Cut-through-stress: In FIG. 4B the applied insertion force of F at region one also converts into equal shear stresses (i.e., $\tau_{s1}$ and $\tau_{s2}$) acting on the same −y axis direction, causing a positive force that is responsible for cutting through the outermost layer of the epidermis ($|\Sigma\tau_{xy}|=|\tau_{s1}+\tau_{s2}|\sin\theta_s|, >0$). At region one, the magnitude of the shear stress is moderate but significantly increases throughout region two as described mathematically and, again, the tip is moved to the left as shown in FIG. 9B. During microneedle insertion, when the off-center tip 5a of the tip region 5 reaches region two, there is a pure shear force from the left, non-angled side of the microneedle ($\tau_{xy}$) that adds to the shear force applied to the $A_3$ ($\tau_{s3}/|\sin\theta_s|$) which are responsible for the significant increase of the shear stress at region two (i.e., $\Sigma\tau_{xy}|=|\tau_{xy}+(\tau_{s3}/|\sin\theta_s|$, therefore $|\tau_{xyNET}|>>0$, therefore: $|\tau_{xynet\ of\ Region\ 2}|>>\tau_{xynet\ of\ Region\ 1}|$ This means that region two shear stresses are much greater than for region one. The relationship between loc and the cut-through stress, as well as the loc to the applied force required is established to be $\tau_{xyNET}\propto(l_c/loc)$, and $F_{ins-required}\propto(l_c/loc)$, respectively. This means that manipulating loc, within the boundary conditions of $0 \leq loc < c$, allows optimizing of the practical requirements such as microneedle array insertion force and materials properties capable of producing a large enough safety factor.

Tip design affects the microneedle safety factor. The safety factor (SF) of a design or a material is defined as the ratio between the strength (ultimate strength or the yield strength) of the material and the maximum stress in the part. The SF indicates, in a specific area of the model, whether the stress is higher than the strength the material can bear. Yield strength of the material is the reference point for calculating the safety factor of the microneedles. This is because elastic deformation (i.e., non-permanent deformation) of the microneedles during the life of the device is important.

Safety Factor=(Yield Strength)/(Working or Design Stress)

or

Safety Factor=(Ultimate Strength)/(Working or Design Stress)

An aspect of the off-center tip that enables a higher SF purely based on the two-region geometry of the microneedles is partial transfer of the given insertion force applied (F) to be consumed for producing a deflection to the body of the microneedle starting from region two. This reduces the overall design stress on the body of the microneedle and therefore increases the SF purely based on the design (i.e., SF∝[1/(Design Stress)]).

Figure 5B:
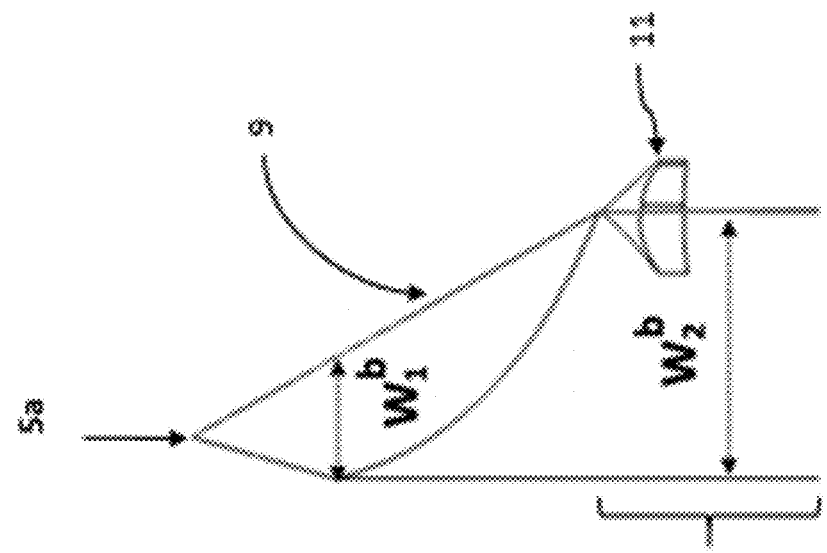
FIG. 5A contrasts safety factor for prior art versus the improved microneedle in FIG. 5B.
Figure 5A:
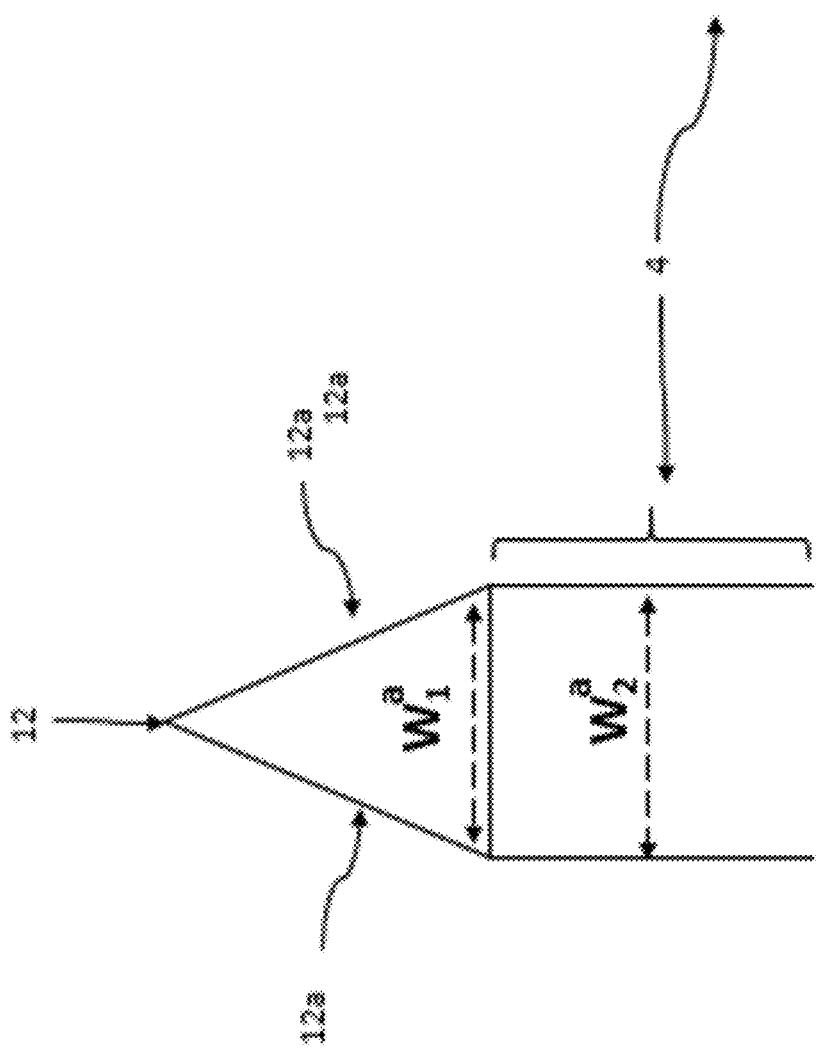

FIGS. 5A-B illustrate an example of the safety factor distribution throughout the body of the microneedle at an applied insertion force of 1N/microneedle with PMMA-like materials, where N represents Newton. Aside from the design features, the SF of the microneedle can be greatly optimized based on the microneedle counts on an array, materials used, and design specifications (i.e., microneedle height, cross-sectional diameter, etc.) W1/W2 and the impact on the Safety Factor of the microneedle body. To clarify this phenomenon, the off-center tip in FIG. 5B is compared with the prior art centric conical microneedle in FIG. 5A. At the given insertion force F, due to the smaller cross-sectional area of $W_1$ in FIG. 5B, where W is width of the microneedle, the stress on the model in FIG. 5B (F/Wb1) is more than the stress on the FIG. 5A region one (F/Wa1), and therefore the required skin insertion F will be lower in FIG. 5B (or the smaller force is needed to produce the same result for insertion). This requires less Force for the region two of the model in FIG. 5B and therefore produces a higher safety factor at the body of the microneedle in FIG. 5B. Therefore, for this model with $0 \leq$ W1/W2<1, the smaller the ratio of (1) (W1/W2) (at a constant W2) then the larger the safety factor. The off-center tip in FIG. 5B, more or less, acts as a needle with a smaller cross-sectional area (a smaller needle gauge inside of a larger needle gauge) along region one, while keeping the larger cross-sectional area at the body.

Figure 6A:
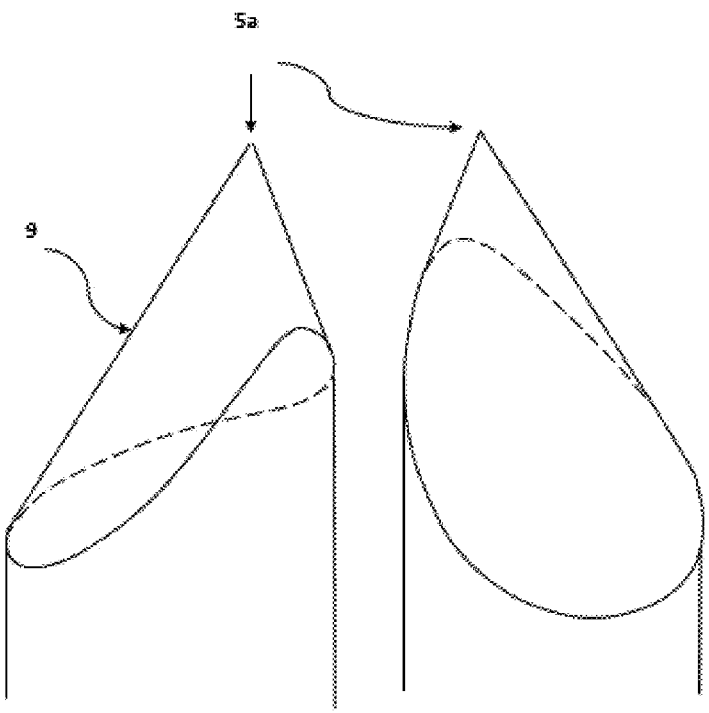
FIG. 6A is a drawing of the major and minor surfaces and 6B is an image of the side of a tip region comprising the off-center tip.
Figure 6B:
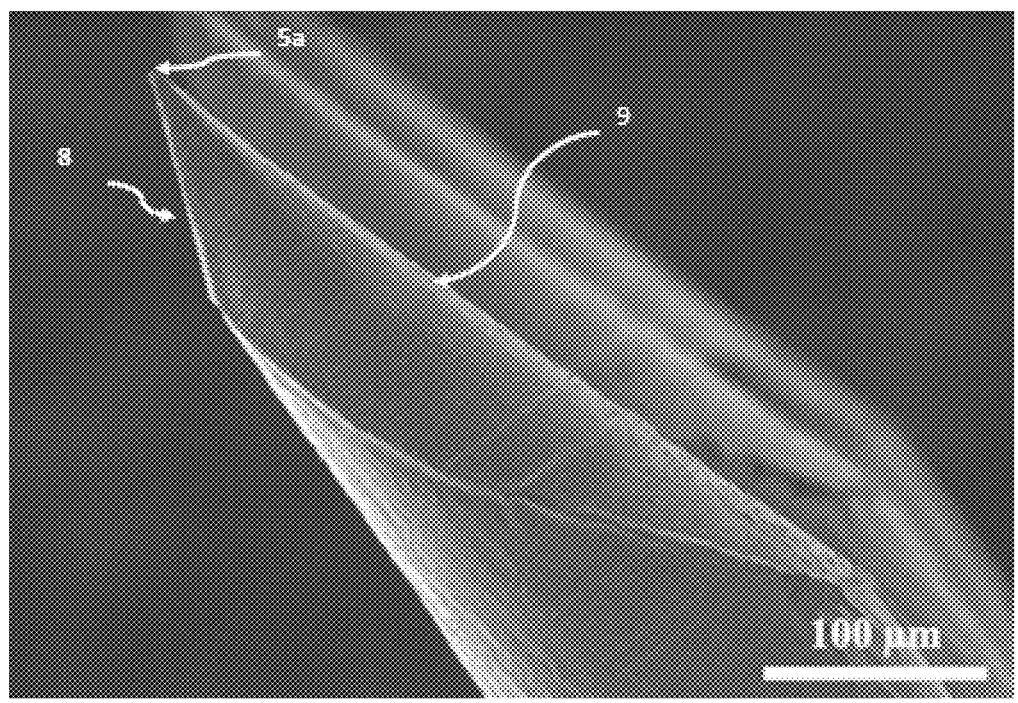
Figures 10A, 10B, 10C, 10D:
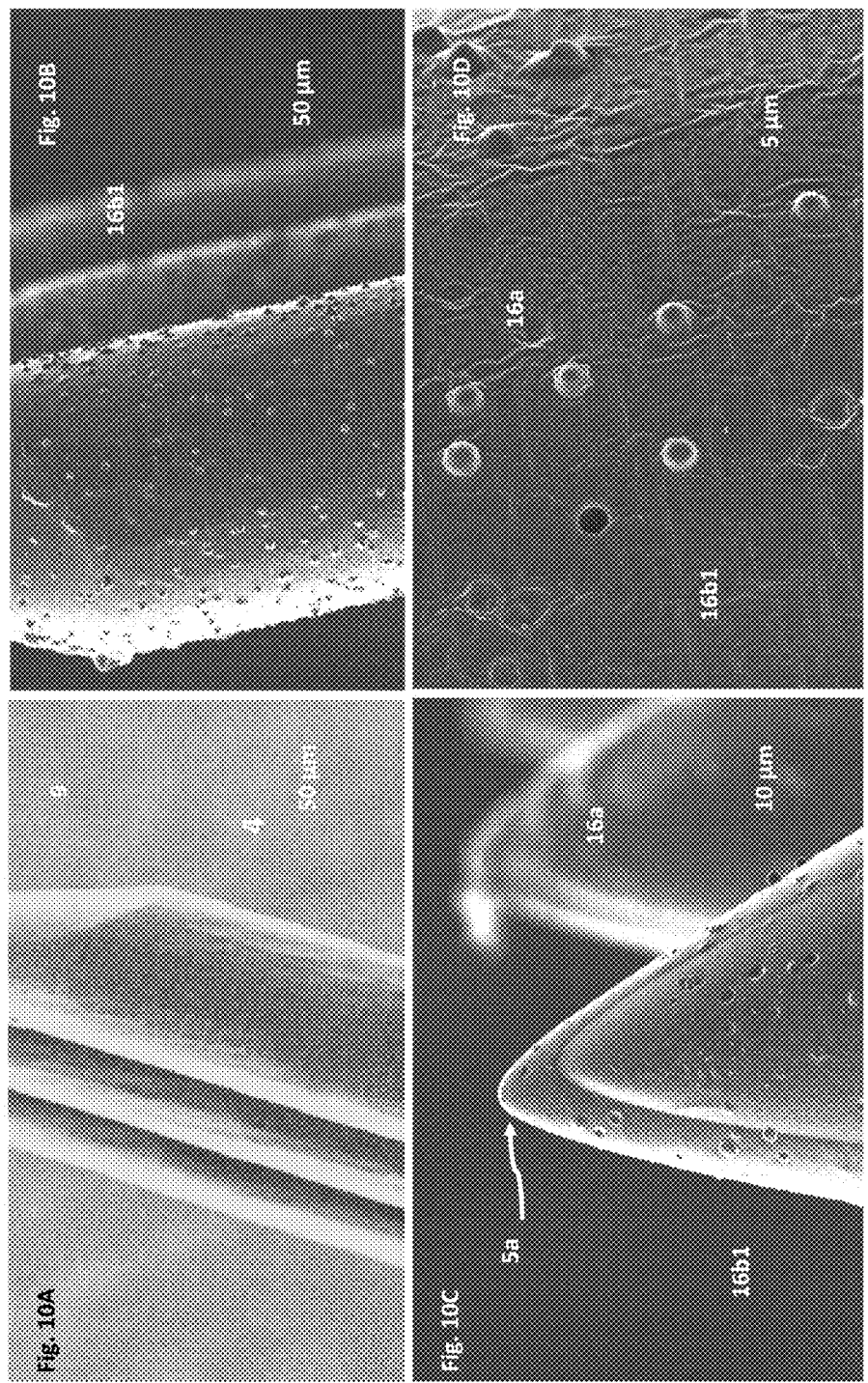
FIG. 10A-10D are SEM images of knobs and regular cavities.

The major and minor surfaces can be designed and fabricated to be a doubly curved surface. The doubly curved surface enhances the angular stress or overall shear stress at the microneedle/skin interface which is responsible for cutting through the skin, and therefore requires less insertion force and thus the user will notice it less. FIG. 6A contains drawings, in various embodiments, of the doubly curved surface, and FIG. 6B is an image of one embodiment of the curved major surface 9.

Skin locking includes the novel tip geometry and locking mechanism described herein including the indentation and the locking sills. Sills extend outward from the edge of the microneedle, and have a curved or slanted surface to aid with insertion; otherwise the sills may be shaped differently than those depicted herein. The off-center tip means the applied pressure during the skin insertion induces deflection at the microneedle body while being inserted into the skin. The deflection resulting from this geometry plays a role in a skin-locking mechanism distinct from aspects of the tip geometry and is described further herein. FIGS. 7A-D are four views of a cylindrical microneedle with the off-center tip, the indention and the sills described herein. FIG. 7A is a perspective view, FIG. 7B is a side view, FIG. 7C is a back view and FIG. 7D is a front view. The skin locking mechanism also includes at least one sill (within a range of approximately 1-10) on the body of the microneedle as shown in FIGS. 7A-7D. In this embodiment the sills start from the intersection between the microneedle tip region two and the microneedle body on the side with the major axis. These sills enhance the skin/microneedle-body interlocking and therefore help to reduce the non-analyte signals such as, for example, the user's bodily movements. In the cross section in FIG. 7E, the major surface with a larger contact angle of $\gamma=135°$ promotes sliding of the skin surface during microneedle insertion and a locking angle of $\alpha=90°$ which promotes applied forces beyond the normal microneedle physical oscillations.

In some embodiments, in order to guide deflection during insertion, the body of the microneedle has an indention 10 (semi-circular in one embodiment) placed on the lower body of the microneedle 2, as shown in FIGS. 8A-B, to both guide the direction of the bending deformation during skin insertion and to regulate the magnitude of the microneedle body region deformation during microneedle insertion into the skin. The ratio of indention radius (R) to the radius of the microneedle bodily cross section ($r_1$) has a direct relation with the dl of the tip (deflection magnitude). The higher the ratio, the larger the bending deformation will be during insertion and thus the more angled the skin insertion (i.e., more parallel to the skin surface). In FIGS. 8A-B, the placement of the indention 10 to guide deformation is closer to the microneedle base and creates a creates a Length (L). The magnitude of L is directly proportional to the Torque ($t=F_{Net} \cdot L$). Torque is the net force ($F_{Net}$) multiplied by the Length (L), where the net force is the Normal force, generated across the microneedle body. Like R/r, the larger the L, the larger the t and the more angled the skin insertion (i.e., the more parallel is the insertion to the skin surface as compared to normal stress to the skin surface) at a constant $F_{Net}$.

FIGS. 8A-B depict the deflection simulation of a single microneedle at the $F_{ins}=1N$/Array and PMMA material from two different angles, and the strain caused within the body of the microneedle, where $F_{ins}$ is insertion force and N is Newton.

The dynamics and mechanism of the skin lock mechanism function can be shown in three different views. FIG. 9A is pre-insertion in a zero-force state. FIG. 9B shows the force-based deflection during insertion. As a result of the off-center tip as well as the indention, as shown in FIG. 9B, the net applied stress on the microneedle(s) during insertion causes a torque that causes deflection of the microneedle during insertion. The position of the microneedle, before deflection, is shown in in 9A and 9B, and 9B also shows the "leaning to the left" position during insertion and deflection, and the movement to the left in the dotted line arc. FIG. 9c, demonstrates the movement of the needle post-insertion from "leaning to the left," with a dotted line arc showing movement back to its approximate position before insertion. After removal of the applied insertion force, and due to the intrinsic elasticity (i.e., spring-like quality) of the microneedle, there is a net retraction torque that not only springs back the microneedle (shown by the rotation direction in 9C) but also enhances microneedle-skin interface interaction/locking at the microneedle sills. The sills 11 help minimize movement within the tissue during the insertion life of the microneedle, and thus reduce electrochemical noise during sensor operation.

In various embodiments, the microneedles herein also have other improvements over the prior art. These improvements are anomalies in the microneedles selected from the group consisting of knobs 16a, cavities 16b1 and 16b2, and solid additives 16c selected from the group consisting of spheres, sheets and fibers. Anomalies are produced as well by liquid additives to material before it is molded or printed or made solid by other methods. FIGS. 10A-10D contain scanning electron microscopy (SEM) images of microneedles with the off-center tip 5a showing in 10A no surface anomalies, compared with 10B having knobs and regular-shaped cavities, 10C with higher magnification views at the microneedle tip region and in 10D on the body of the microneedle (knobs and cavities).

Figure 11:
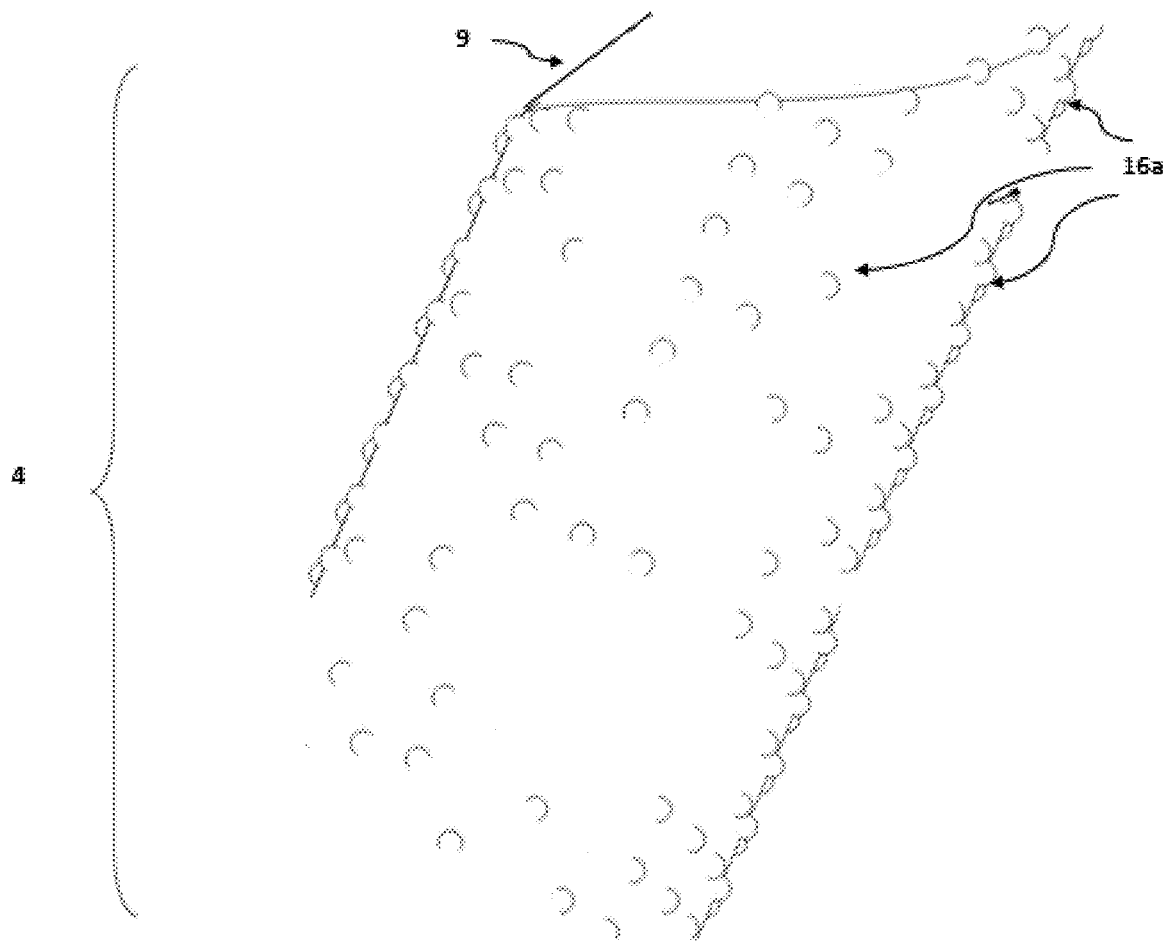
FIG. 11 is a perspective drawing of knobs on the body of the microneedle.

As shown in one embodiment in FIG. 11, knobs 16a on the microneedle body at the optimal areal surface density and shape can vary the mechanical properties of the microneedles. In one embodiment they can reduce the microneedle/skin insertion forces by reducing the microneedle body/skin friction and enhancing the sliding of the microneedle through the skin. Knobs 16a can be created in several ways including: 1) adding solid particles into the liquid material before molding or printing, 2) spraying solid particles onto the microneedles before they are fully cured allows the particles to create a bond with the microneedle after curing, and 3) applying an adhesive to the microneedles and then spraying solid particles onto the microneedles. All of these methods produce a random pattern of knobs.

Figure 12:
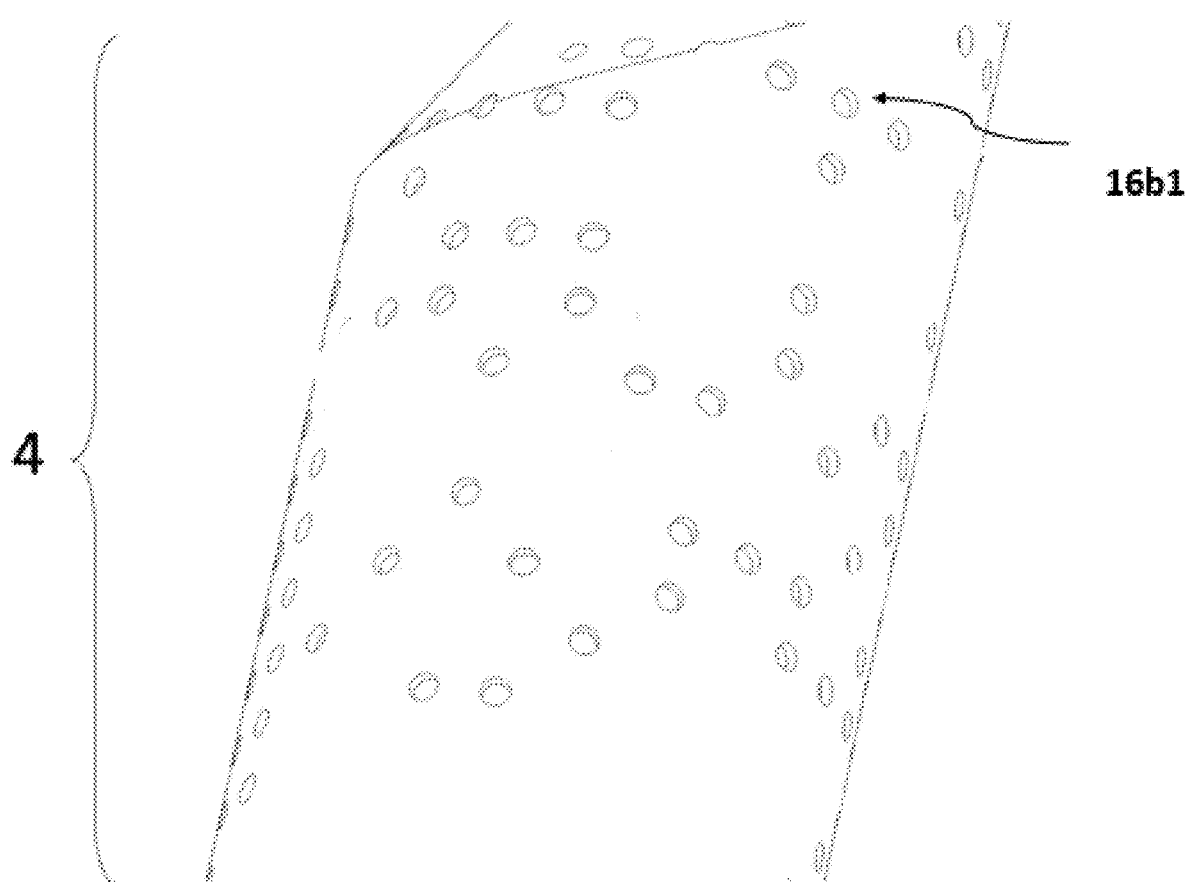
FIG. 12 is a perspective drawing of regular cavities on the body of the microneedle.
Figure 13:
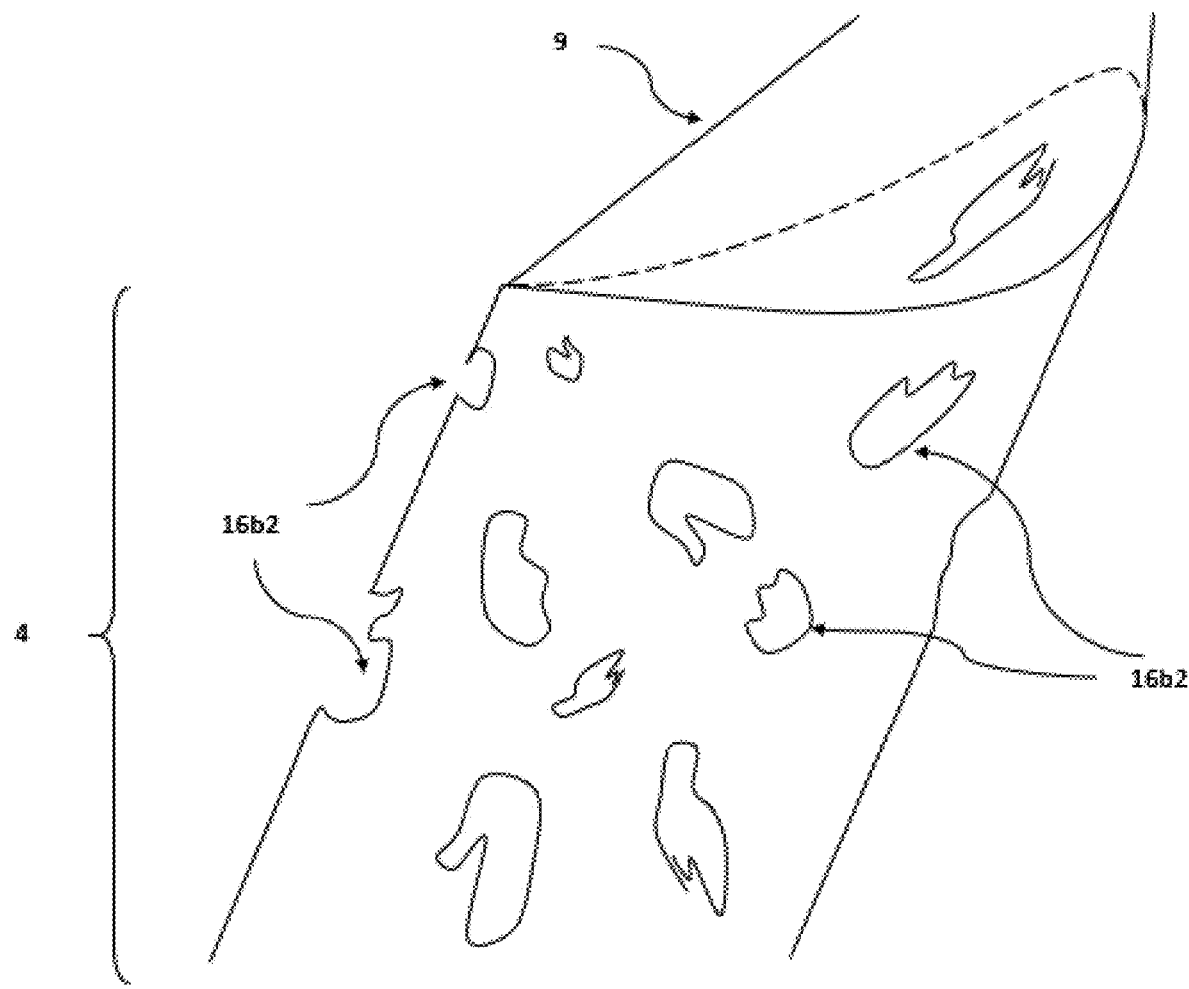
FIG. 13 is a perspective drawing of amorphous cavities on the body of the microneedle.

FIG. 12 is one embodiment of a portion of a microneedle body with regular-shaped cavities at the surface of the microneedle. Cavities can either be a regular-shaped 16b1 as in FIG. 12 or amorphous 16b2 as in FIG. 13, a partial microneedle body illustrated with amorphous cavities. Cavities 16b1, 16b2 allow for more anchoring surface for the subsequent sensing (for sensing applications) and/or drug loading (for drug delivery application) layers immobilized on the surface of the microneedle tip region and body. A greater volume of regular-shaped or amorphous cavities can increase anchoring and loading of the desired materials, reagents, drugs and more. Cavities can also increase the flexibility of a microneedle, especially near the indention 10. The cavities can be superficial or extend to the core of the microneedle. The depth/extent and shape of regular-shaped and amorphous cavities throughout the microneedle can be engineered by nano-surface engineering of the sacrificial component to the structure of the microneedle.

In some embodiments, regular-shaped cavities 16b1 are created by adding solid additives to the liquid polymer, for example, polystyrene spheres. These spheres as they contact the edge of the microneedles after molding can be removed by exposure to a chemical such as an acid or alcohol, leaving an opening with the shape of the sphere. All of the cavities disclosed herein are randomly distributed, unlike pores described in the '298 patent created by a CNC process. In various embodiments, amorphous cavities 16b2 are created by adding liquids or irregularly shaped material into the liquid polymer prior to molding, and after molding and curing then submerging the microneedles into chemicals (e.g., acetone or acid) etches away the additive and leaves an amorphous cavity, and these cavities are randomly distributed.

Another method of producing the cavities comprises the following steps: adding one or more types of additives (e.g., polymer, ceramic, metal, metal-oxide, sugars, and/or sacrificial material whether amorphous or crystalline, 0.1-10 micron in diameter) in suspensions/colloids to a biomedical-grade non-cured polymeric medium, mixing, sometimes aging for a certain time, pouring the mixture into a substrate/microneedle mold, followed by de-bubbling, curing (e.g., photo-crosslinking, heating, etc.) of the liquid, removal from the mold, and exposing the microneedle to a suitable solvent for a specific time to remove or desirably impact the additive to achieve the desired property. The cavity sizes and densities on the surface and/or in the microneedle body are adjusted by methods including without limitation the methods described herein.

Another method of forming cavities on the surface of the microneedle is plasma bombardment during which a plastic material such as PMMA is exposed to a high-energy plasma field. This plasma containing components selected from the group consisting of ions, electrons, and reactive species, and the plasma interacts with the PMMA surface, etching away material and creating a textured landscape of cavities at the nanometer to micrometer scale. The specific characteristics of these amorphous cavities—such as their size, shape, and distribution—are governed by the parameters of the plasma treatment, which include the type of gas used (e.g., oxygen, nitrogen, or argon), the plasma power, exposure time, and the presence of any additional reactive agents. The energetic particles in the plasma effectively break the molecular bonds in the surface layers of the PMMA, removing material and leaving behind a structure with cavities which enhance the surface properties, such as increased hydrophilicity, biocompatibility, or permeability, and expanding the material's sensing characteristics such as better anchoring/adhesion and loading of the chemical element.

Figure 14:
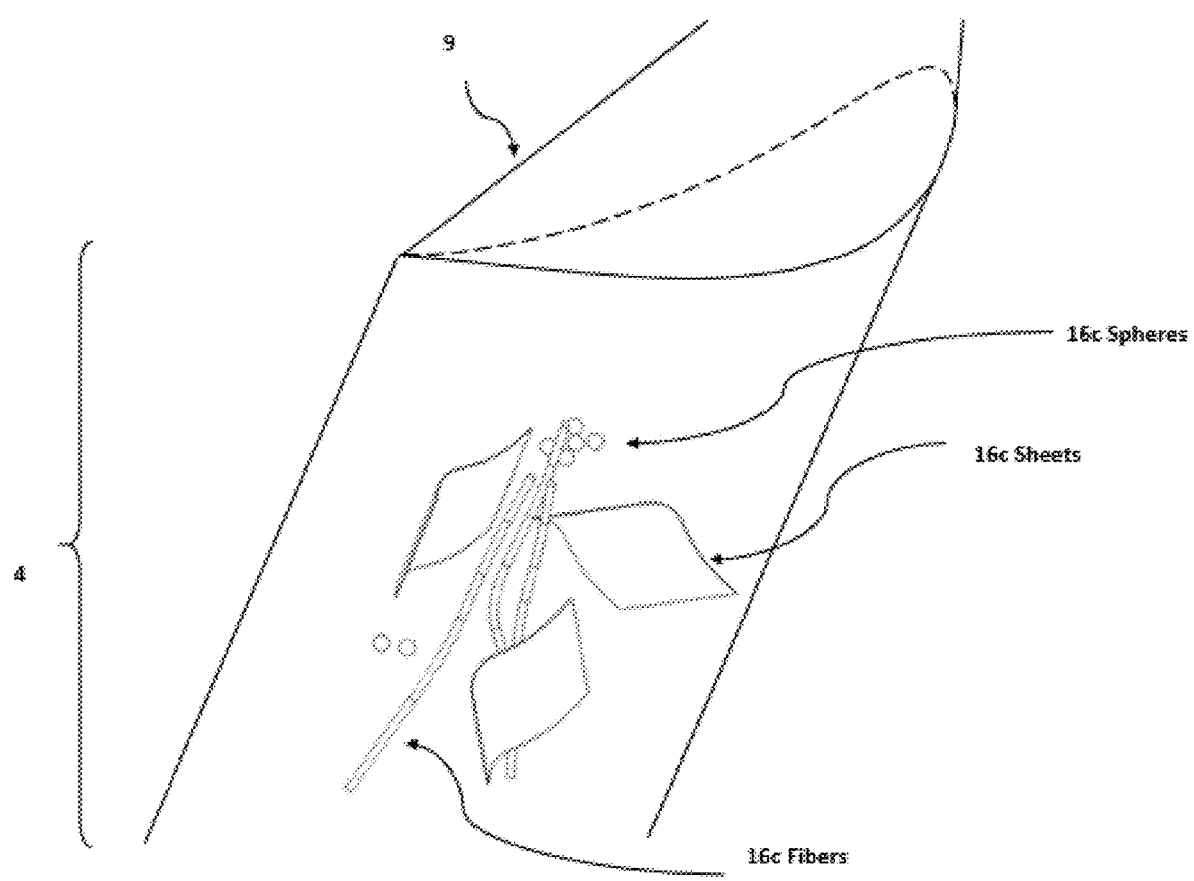
FIG. 14 is an idealized drawing of solid additives in the microneedle.

Additives in the manufacturing process are retained within the body region and/or on the surface of the microneedle to add properties and capabilities inside or on the surface of the microneedle in order to optimize the performance for sensing or drug delivery. Electrical properties of the microneedles can be tuned as desired. For instance, the conductivity of the microneedle body can be manipulated by introduction of additives such as solid particles 16c such as polymers, fibers, sheets and/or conductive or non-conductive liquid materials can produce highly conductive, semi-conductive, or non-conductive microneedle electrodes, in one embodiment as shown in FIG. 14 with spheres, sheets and fibers. Additives are selected from the group consisting of conductive polymers selected from the group consisting of PEDOT:PSS (poly(3, 4-ethylenedioxythiophene) polystyrene sulfonate) and non-conductive elastic polymers selected from the group consisting of PDMS (Polydimethylsiloxane). FIG. 14 is a partial microneedle body illustrated with solid additives selected from the groups consisting of spheres, sheets and fibers.

Engineering of the electrochemical properties of the microneedle by changing the surface morphology includes increasing surface area on the individual microneedles with anomalies such as cavities. This benefits electrochemical sensing performance by: (A) enhancing the electrochemical sensitivity by increasing the surface of the microneedles with the surface of the cavities exposed to the surface which allow higher loading of the recognition element or drug to be delivered at a given microneedle; (B) improving immobilization of the sensing or drug delivery layers by increasing anchorable surface area with the added surface of the cavities; (C) increasing the stability and wear-time of the microneedle from both of the "A" and "B" phenomena occurring subsequently.

Cavities in the microneedle can enhance the stability of the electrochemical response of the microneedle through the following. First, surface cavities on the Working Electrode (WE) microneedle can hold and retain different layers of the sensing chemistry. Encapsulation of the biorecognition layer inside these cavities increases the anchoring and surface adhesion of the sensing or drug layers and protect the layer against mechanical delamination when inserted into the body. Additionally, the enhanced surface adhesion diminishes the leaching of the layer. Next, for the Reference Electrode (RE) microneedle, the cavity structure also diminishes the leaching of the solid electrolyte (a hydrogel polymer containing a saturated concentration of a salt such as sodium chloride) and therefore diminishes the potential drift of the reference electrode over time and enhances the stability. Additionally, in the case of drug delivery applications, cavities enhance the drug loading at the surface of the individual microneedles which in turn enhances the effective drug releasing wear time on a given microneedle.

Engineering of the mechanical properties of the microneedles can be engineered by additives which, in differing embodiments, include at least one type of different particles, precipitates, and inclusions. The resin/additive mixture creates a composite like material with highly tunable mechanical properties towards desired wearing applications.

Like the other properties, the chemical properties of the microneedle can be greatly impacted by introduction of anomalies to the microneedle resin before curing. An example is the tailoring of the catalytic activities of the microneedle electrode to the desirable sensing application with materials selected from the group of carbon based materials such as graphene, carbon nano tubes (CNT) and ultrafine amorphous graphite for carbon based catalytic sensing applications; organo-metallic complexes such as Prussian blue; metal oxides such as iron oxide and iridium oxide; and metal nano particles selected from the group consisting of platinum, gold and iridium.

Figure 15A:
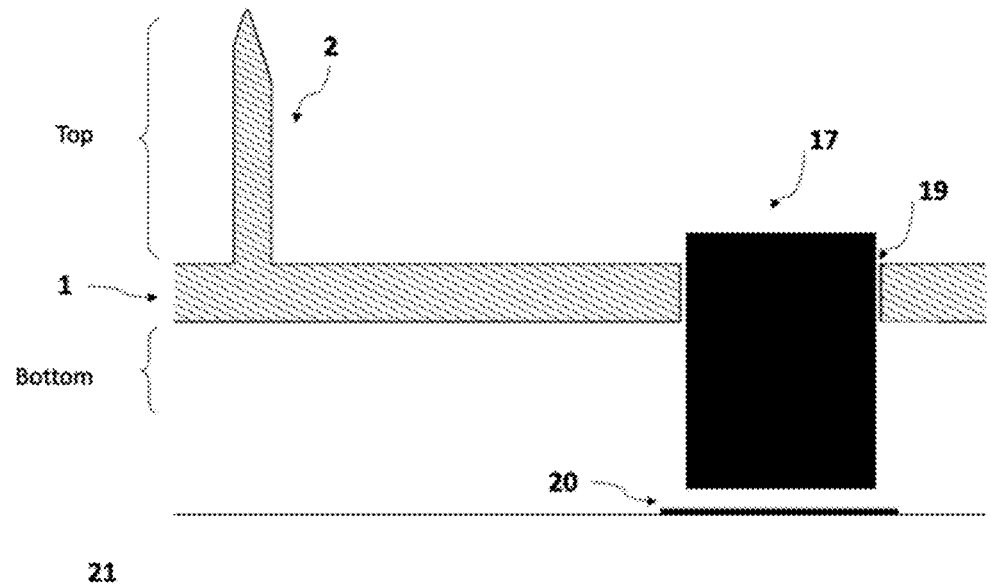
FIG. 15A is a depiction of the bonded pins and FIG. 15B is a depiction of the pins as described in the '298 patent, each electrically connecting the microneedles with the electronics unit.
Figure 15B:
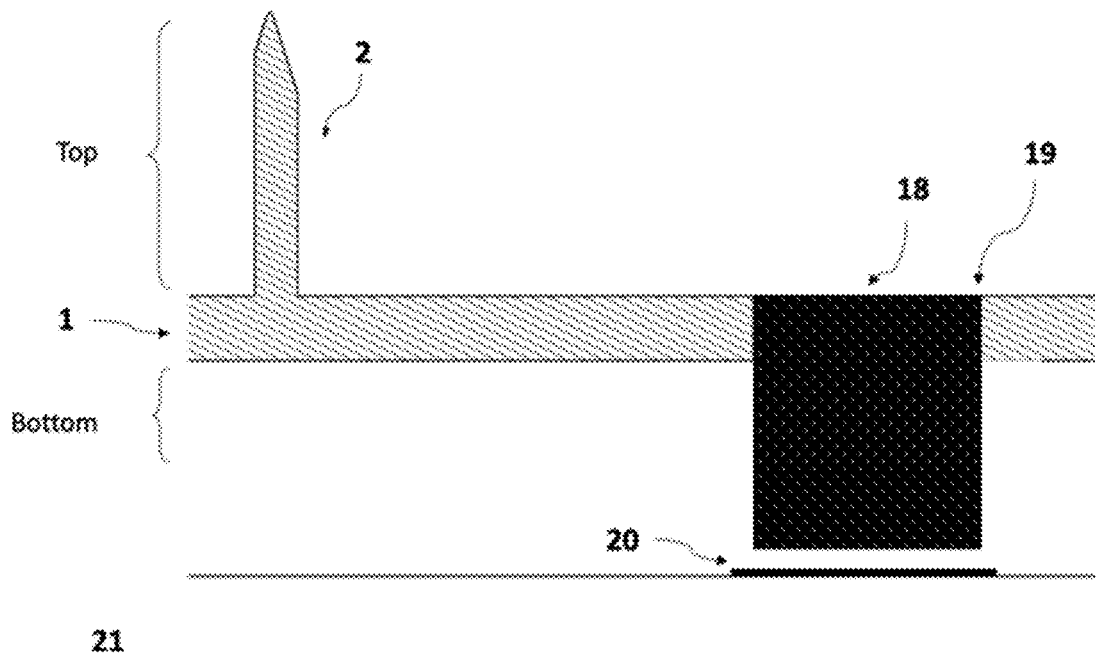

FIGS. 15A-15B contain different embodiments of the electrical interconnections between the electrically conductive layer of the microneedles and the electronics unit. The pins 17 used with frictionous contact pads are made of electrically conductive, elastic, or spring-like materials (e.g., pogo pins). These pins 17 at one end push against these contact pads in the holes 19 in the substrate and at the other end press against, for example, conductive pads 20 on the electronics unit 21. The pins 17 in FIG. 15A was disclosed, for example, elements 526, 510 and 512 in FIG. 5 of the '298 patent, incorporated herein.

In another embodiment, bonded pins 18 represent a different type of electrical interconnection between the microneedle array and the electronics unit. In this embodiment, pins 18 are bonded to the metal layer in the holes of the substrate 1, eliminating the need for friction between against the contact pads. The materials used in this kind of connection are similar to those mentioned herein. The bonding process utilizes curable materials, such as silver epoxy or silicone rubber. In this type of electronic interconnection, either the entire pin or the interface between the pin and the metal layer within the holes in the substrate can be made of elastic conductive materials, as previously mentioned.

ADDITIONAL EXAMPLES

The invention has many other embodiments besides those disclosed above, including examples 1-25 and others.

In example embodiments according to the present disclosure (example 1), a wearable biosensor device includes a microneedle sensor unit and an electronics unit. The microneedle sensor unit includes a substrate comprising an electrically insulative material, an array of microneedle disposed on the substrate, and at least some of the microneedles are configured as electrochemical sensor electrodes to detect an electrical signal from a reaction with a target analyte in a biofluid exposed to the array of microneedles, and at least one electrochemical sensor electrode is functionalized by a chemical layer to interact with the target analyte in the biofluid and produce the electrical signal at the at least one electrochemical sensor electrode, and each microneedle of the array of microneedles includes a body region and a tip region, and the tip region including an off-center tip and major and minor surfaces, an array of base structures comprising an electrical insulator material, and each base structure encases a lower portion of the body region of a corresponding microneedle structure, and a plurality of electrical interconnections disposed in or on the substrate, and each of the electrical interconnections is coupled to one or more of the microneedles configured as the electrochemical sensor electrodes and to a contact terminus on the substrate. The electronics unit is in electrical communication with the plurality of electrical interconnections of the microneedle sensor unit, the electronics unit comprising a circuit board, a signal processing circuit configured on the circuit board, a power source in electrical communication with the signal processing circuit, and a plurality of rigid or flexible conductive pins that electrically couple the microneedle sensor unit to the electronics unit by allowing contact between an a rigid or flexible conductive pin to the terminus region of a corresponding electrical interconnection.

Example 2 includes the device of any of examples 1-25, in which the microneedle sensor unit further comprises a cover unit to couple with the substrate, the cover unit comprising a sensor-cover component formed of an electrically insulative material having an array of openings configured to align with the array of microneedles on the substrate, such that the tip region and at least a distal portion of the body region of the microneedles pass through the array of openings of the sensor-cover component of the cover unit, and the sensor-cover component is configured to protect the microneedle sensor unit's underlying structures from undesired substances contaminating the device.

Example 3 includes the device of any of examples 1-25, and the microneedle sensor unit and the cover unit are configured to be disposable after at least a first use by a user of the wearable, non-intrusive microneedle sensor device used to continuously monitor the target analyte, and the electronics unit is configured to be reusable after at least the first use.

Example 4 includes the device of any of examples 1-25, and the sensor-cover component of the cover unit includes a sidewall that surrounds an interior region and is configured to encompass a side of the substrate when the cover unit is coupled with the substrate, and the cover unit includes a back-cover component that is configured to connect with the sidewall of the sensor-cover component and contact a backside of the substrate.

Example 5 includes the device of any of examples 1-25, and the cover unit further includes a holder having a peripheral sidewall that couples to the sidewall of the cover unit, the holder having an opening such that, when the holder is coupled to the sidewall of the microneedle sensor unit, the array of microneedles expand outward beyond the opening.

Example 6 includes the device of any of examples 1-25, further comprising: an outer casing configured to connect to the holder of the cover unit and encase the electronics unit and the microneedle sensor unit while exposing the array of microneedles from beyond the opening of the holder.

Example 7 includes the device of any of examples 1-25, and each microneedle includes an electrically insulative core that is at least partially coated by an electrically conductive layer that continuously covers at least an off-center tip of the tip region to the lower portion of the body region, such that the electrically conductive layer of the microneedle contacts the corresponding electrical interconnection.

Example 8 includes the device of any of examples 1-25, and the electrically insulative core includes PMMA.

Example 9 includes the device of any of examples 1-25, and the electrically conductive layer includes platinum, gold, silver, chromium, carbon, or other conductive metal or alloy, or a combination thereof.

Example 11 includes the device of any of examples 1-25, and the substrate of the microneedle sensor unit comprises a plurality of channels disposed within or on a surface of the substrate, and at least some of the plurality of channels are at least partially filled by a custom resin which is cured.

Example 11 includes the device of or any of examples 1-25, and the array of microneedles is arranged into two or more subgroups of microneedles from the array, and a first subgroup of microneedles include a first chemical layer to interact with a first target analyte in the biofluid, and a second subgroup of microneedles include a second chemical layer to interact with a second target analyte in the biofluid, and the plurality of channels is configured to provide a first subgroup of electrical interconnections to the first subgroup of microneedles and a second subgroup of electrical interconnections to the second subgroup of microneedles.

Example 12 includes the device any of examples 1-25, and the first target analyte includes one or both of glucose and lactate, and the second target analyte includes one or both of glucose and alcohol.

Example 13 includes the device of any of examples 1-25, and the contact terminus that couples to a respective electrical interconnection is structured within a hole in the substrate that includes an electrically-conductive and mechanically frictionous contact pad, such that a rigid or flexible conductive pin from the electronics unit is in contact with the electrically-conductive and mechanically frictionous contact pad of the terminus region of a corresponding electrical interconnection.

Example 14 includes the device of any of examples 1-25, and the electronics unit further comprises a data processing unit in communication with the signal conditioning unit, the data processing unit comprising a processor and a memory and configured to process the electrical signal as data representative of one or more parameters of the target analyte.

Example 15 includes the device or any of examples 1-25, and the signal conditioning unit is configured to process the electrical signal by one or more of amplifying the electrical signal, filtering the electrical signal, or converting the electrical signal from analog to digital, and the data processing unit is configured to process the electrical signal after processing by the signal conditioning unit.

Example 16 includes the device of any of examples 1-25, and the electronics unit further comprises a wireless communication unit in communication with one or both of the signal conditioning unit and the data processing unit, the wireless communication unit comprising a wireless transmitter or wireless transceiver to at least transmit one or both of the electrical signal and the data to an external computing device.

Example 17 includes the device of any of examples 1-25, and the target analyte includes one or more of a metabolite, ionophore, electrolyte, protein, amino acid, nucleic acid, lipid, liposome, nanoparticle, or drug including a therapeutic drug, licit drug, or illicit drug.

Example 18 includes the device of any of examples 1-25, and the target analyte includes a protein comprising one or more of an enzyme, peptide-based aptamer, antibody, or hormone.

Example 19 includes the device of any of examples 1-25, and the target analyte includes a nucleic acid comprising one or more of a nucleotide, oligonucleotide, oligonucleotide-based aptamer, deoxyribonucleic acid (DNA) or portion thereof, or ribonucleic acid (RNA) or portion thereof.

Example 20 includes the device of any of examples 1-25, and at least one of the microstructures includes a biological or chemical recognition element comprising one or more of an enzyme, an ionophore, an antibody, a peptide nucleic acid (PNA), a DNA aptamer, a RNA aptamer, or a cell.

Example 21 includes the device of any of examples 1-25, and the device is configured to measure the target analyte in the biofluid, comprising any of a subdermal biological fluid.

Example 22 includes the device of any of examples 1-25, and the subdermal biological fluid comprises an interstitial fluid, an extracellular fluid, a cerebrospinal fluid, or blood.

Example 23 includes the device of any of examples 1-25 and the electrical interconnection comprises a rigid or a flexible pin making a friction fit with a contact terminus which is in a hole or on a surface of the substrate, or the rigid or flexible pin is bonded to one of the contact terminus or the electronics unit.

Example 24 includes the device of any of examples 1-25 and the microneedle further comprises an off-center tip, one or more of an indention for guiding deflection of the microneedle on insertion into the skin, sills configured to lock the needle into place after insertion into the tissue and anomalies selected from the group consisting of knobs, regular-shaped cavities, amorphous cavities, liquid curable to an etchable solid and solid additives.

Example 25 is a wearable device for drug delivery wherein a microneedle array is housed in a wearable structure, and the microneedle further comprises a body region and a tip region comprising an off-center tip, and one or more of an indention for guiding deflection of the microneedle on insertion into the skin, sills configured to lock the needle into place after insertion into the tissue and anomalies selected from the group consisting of knobs, regular-shaped cavities, amorphous cavities, liquid curable to an etchable solid and solid additives, and is configured with a chemical layer containing drugs to be released into the body.

We claim:

1. A wearable biosensor device comprising a microneedle array comprising a substrate with microneedles disposed on the substrate, said microneedle array comprising an electrically insulative material, the microneedles being solid, and at least a portion of the microneedle array being coated with an electrically conductive layer, wherein at least some of the microneedles are configured as at least one electrochemical sensor electrode to detect an electrical signal from a reaction with a target analyte in a biofluid exposed to the microneedle array, wherein at least one of the microneedles is a working electrode functionalized with at least one chemical layer positioned on the electrically conductive layer, and the microneedles comprise a base, a body region, an outer edge, a center and a tip region comprising a tip, and wherein at least some of the microneedles are further configured to guide deflection during insertion into skin wherein at least some of the tips are off-center and the tip is located between the outer edge and the center of the microneedle within the tip region further comprising at least one major surface and one minor surface, and at least some of the body regions comprise a concave indention on or near the base and opposite the at least one major surface, a cover unit to couple with the substrate, the cover unit comprising a sensor-cover component formed of the electrically insulative material having an array of first openings configured to align with the array of microneedles on the substrate, such that the off-center tip and at least a distal portion of the body region of the microneedles pass through the array of first openings of the sensor-cover component of the cover unit, wherein a bottom portion of the cover unit and/or the substrate comprise microfluidic channels containing a cured custom resin extending upward to a cut-off fluidic line, the cured custom resin forming a base structure on a respective microneedle, the cured custom resin insulating and securing the cover unit to the substrate and the microneedles, and a plurality of electrical interconnections connecting the electrically conductive layer at a contact terminus in or on the substrate with an electronics unit.

2. The device of claim 1 wherein each of the electrical interconnections comprises a contact terminus comprising an electrically-conductive and frictionous contact pad in an opening of a substructure in or on the substrate, and wherein the frictionous contact pad is electrically connected to the electrically conductive layer, and a rigid or flexible conductive pin is connected with a friction fit at one end compressed to the frictionous contact pad and electrically connected at another end to the electronics unit.

3. The device of claim 2 wherein each of the electrical interconnections further comprises a bonded pin comprising two ends and being conductive and rigid or flexible, wherein at least one end of the bonded pin is bonded to one of the contact terminus or to the electronics unit.

4. The device of claim 1, wherein the electronics unit comprises a data processing unit in communication with a signal processing circuit, the data processing unit comprising a processor and a memory and configured to process the electrical signal as data representative of one or more parameters of the target analyte.

5. The device of claim 4, wherein the signal processing circuit is configured to process the electrical signal by one or more of amplifying the electrical signal, filtering the electrical signal, or converting the electrical signal from analog to digital, and wherein the data processing unit is configured to process the electrical signal after processing by the signal processing circuit.

6. The device of claim 4, wherein the electronics unit further comprises a wireless communication unit in communication with one or both of the signal processing circuit and the data processing unit, the wireless communication unit comprising a wireless transmitter or wireless transceiver to at least transmit one or both of the electrical signal and the data to an external computing device.

7. The device of claim 1 wherein the substrate and the microneedles and the cover unit are composed of a material selected from the group consisting of nonconductive polymer suitable for a mold and materials for 3D printing.

8. The device of claim 1 wherein the major surface and minor surface are selected from the group consisting of curved and flat.

9. The device as in claim 1 wherein the body region and the tip region comprise randomly distributed anomalies selected from the group consisting of knobs, cavities, liquid curing to an etchable solid and solid additives.

10. The device of claim 1, wherein the microneedles are differentiated into at least two sensing regions wherein each of the sensing regions comprises at least one of the working electrodes functionalized for a different target analyte, and each sensing region is separated electrically from all other of the sensing regions.

11. The device of claim 1, wherein the body regions of the microneedles have a shape selected from the group consisting of a cylinder and a prism which is triangular, rectangular, pentagonal and hexagonal.

12. The device of claim 1, wherein the at least one chemical layer comprises a material selected from the group consisting of an enzyme, an ionophore, an antibody, a peptide nucleic acid (PNA), a DNA aptamer, a RNA aptamer, a molecularly imprinted polymer (MIP), and a cell.

* * * * *